US012731223B2

(12) United States Patent
Saito

(10) Patent No.: US 12,731,223 B2
(45) Date of Patent: Sep. 8, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Sho Saito, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 366 days.

(21) Appl. No.: 18/588,053

(22) Filed: Feb. 27, 2024

(65) Prior Publication Data

US 2024/0296522 A1 Sep. 5, 2024

(30) Foreign Application Priority Data

Mar. 3, 2023 (JP) ................................ 2023-033068

(51) Int. Cl.

| | |
|---|---|
| ***G06T 5/60*** | (2024.01) |
| ***G06V 10/70*** | (2022.01) |
| ***G06V 10/764*** | (2022.01) |
| ***G06V 10/82*** | (2022.01) |
| ***G06V 10/94*** | (2022.01) |

(52) U.S. Cl.

CPC .............. *G06T 5/60* (2024.01); *G06V 10/764* (2022.01); *G06V 10/82* (2022.01); *G06V 10/87* (2022.01); *G06V 10/945* (2022.01); *G06T 2207/20081* (2013.01); *G06T 2207/20084* (2013.01); *G06T 2207/20092* (2013.01)

(58) Field of Classification Search

CPC ............. G06T 5/60; G06T 2207/20081; G06T 2207/20084; G06T 2207/20092; G06V 10/764; G06V 10/82; G06V 10/87; G06V 10/945

USPC ........................................................ 382/157

See application file for complete search history.

(56) References Cited

U.S. PATENT DOCUMENTS

2017/0154425 A1* 6/2017 Pierce .................. G06V 10/255
2018/0285698 A1* 10/2018 Yamada ........... G06V 30/19167
2021/0004699 A1* 1/2021 Okuno ................... G06V 10/82

(Continued)

FOREIGN PATENT DOCUMENTS

JP 2021-077129 A 5/2021

OTHER PUBLICATIONS

Tassano, M. et al., “FastDVDnet: Towards Real-Time Deep Video Denoising Without Flow Estimation” arXiv:1907.01361v2 (Apr. 2020) pp. 1-13.

*Primary Examiner* — Allen H Nguyen

(74) *Attorney, Agent, or Firm* — Carter, DeLuca & Farrell LLP

(57) ABSTRACT

There is provided with an information processing apparatus. A performing unit performs inference on an input using a first machine learning model. A selecting unit selects a second machine learning model, in which at least some of components of a network structure of the first machine learning model have been changed, as a machine learning model used for the inference, in response to a predetermined condition being satisfied. The first machine learning model has a first component and a second component. The second machine learning model has at least a component in which a parameter or a path between nodes in the first component or the second component has been changed.

14 Claims, 22 Drawing Sheets

(56) References Cited

U.S. PATENT DOCUMENTS

| | | | | |
|---|---|---|---|---|
| 2023/0359180 | A1* | 11/2023 | Kim | G11C 29/44 |
| 2024/0296518 | A1 | 9/2024 | Saito | |
| 2025/0069358 | A1* | 2/2025 | Khinvasara | G06V 10/255 |

* cited by examiner

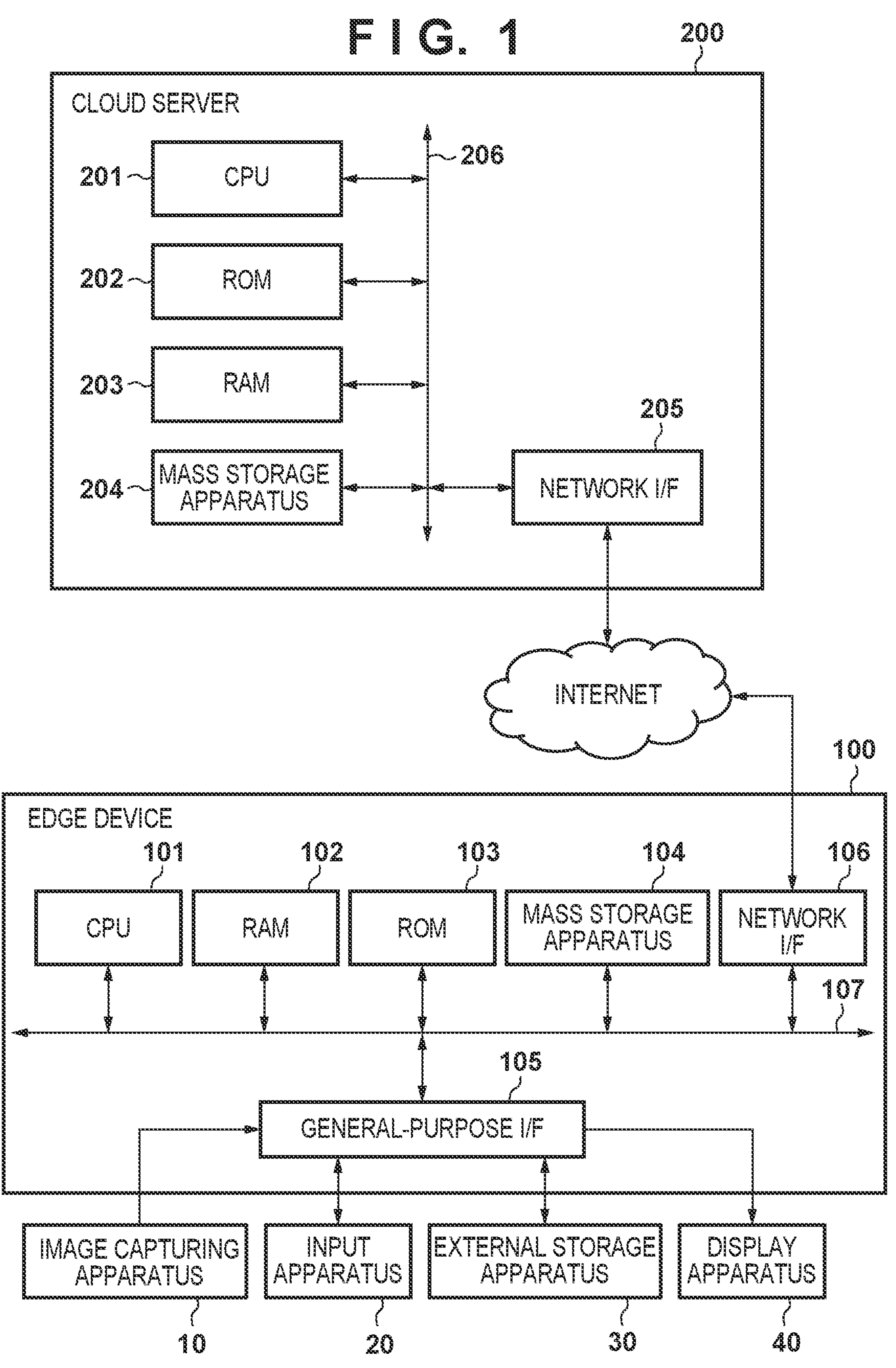
F I G. 1
200
CLOUD SERVER
201
CPU
202
ROM
203
RAM
204
MASS STORAGE APPARATUS
206
205
NETWORK I/F
INTERNET
100
EDGE DEVICE
101
CPU
102
RAM
103
ROM
104
MASS STORAGE APPARATUS
106
NETWORK I/F
107
105
GENERAL-PURPOSE I/F
IMAGE CAPTURING APPARATUS
INPUT APPARATUS
EXTERNAL STORAGE APPARATUS
DISPLAY APPARATUS
10
20
30
40

F I G. 2
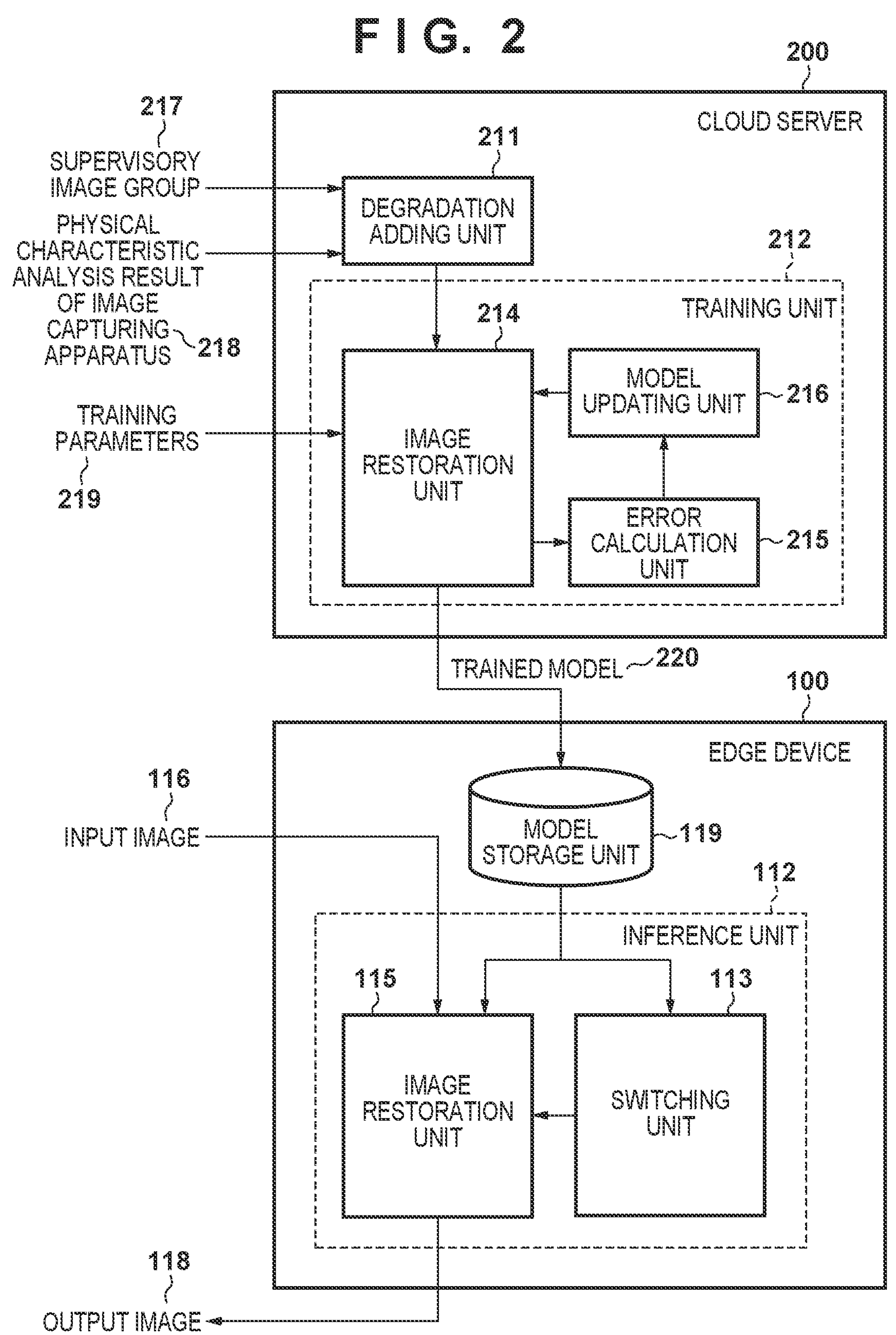

INFERENCE
116
INPUT IMAGE
301
PRE-PROCESSING
302
MODEL EXECUTION
303
POST-PROCESSING
118
OUTPUT IMAGE

TRAINING
306
SUPERVISORY IMAGE GROUP
INPUT IMAGE GROUP
PAIRS
308
INPUT IMAGE
310
PRE-PROCESSING
305
MODEL EXECUTION
313
RESTORATION RESULT
315
UPDATE MODEL
309
SUPERVISORY IMAGE
311
PRE-PROCESSING
314
Loss CALCULATION PHYSICAL CHARACTERISTIC ANALYSIS RESULT OF IMAGE CAPTURING APPARATUS
WHEN THERE IS NOISE
DISTRIBUTION
ILLUMINANCE
218
217
DEGRADATION FACTOR
502
505
501
503
504
SUPERVISORY IMAGE GROUP
SUPERVISORY IMAGE
INPUT IMAGE
SUPERVISORY IMAGE GROUP
INPUT IMAGE GROUP
PAIR F I G. 6A
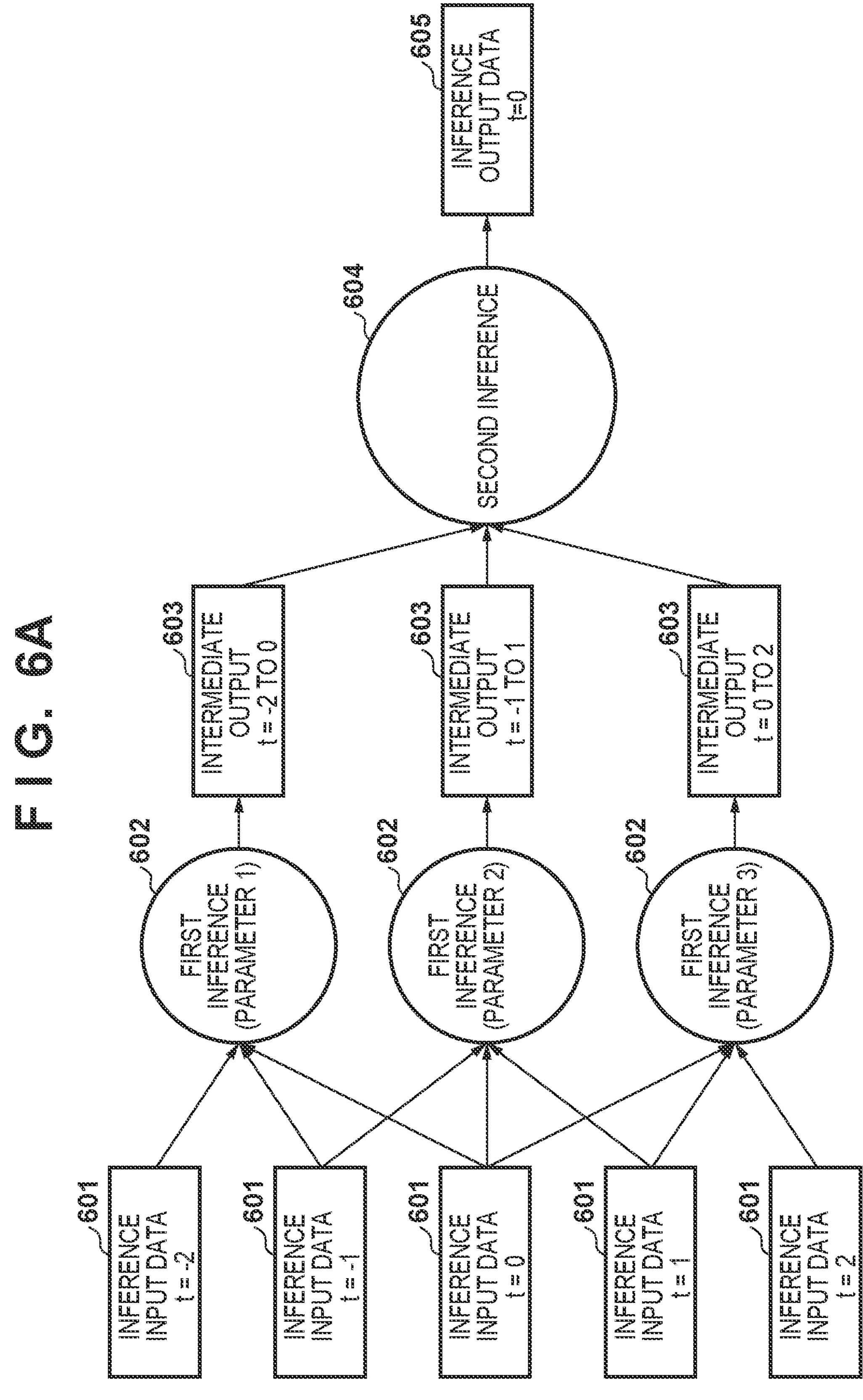

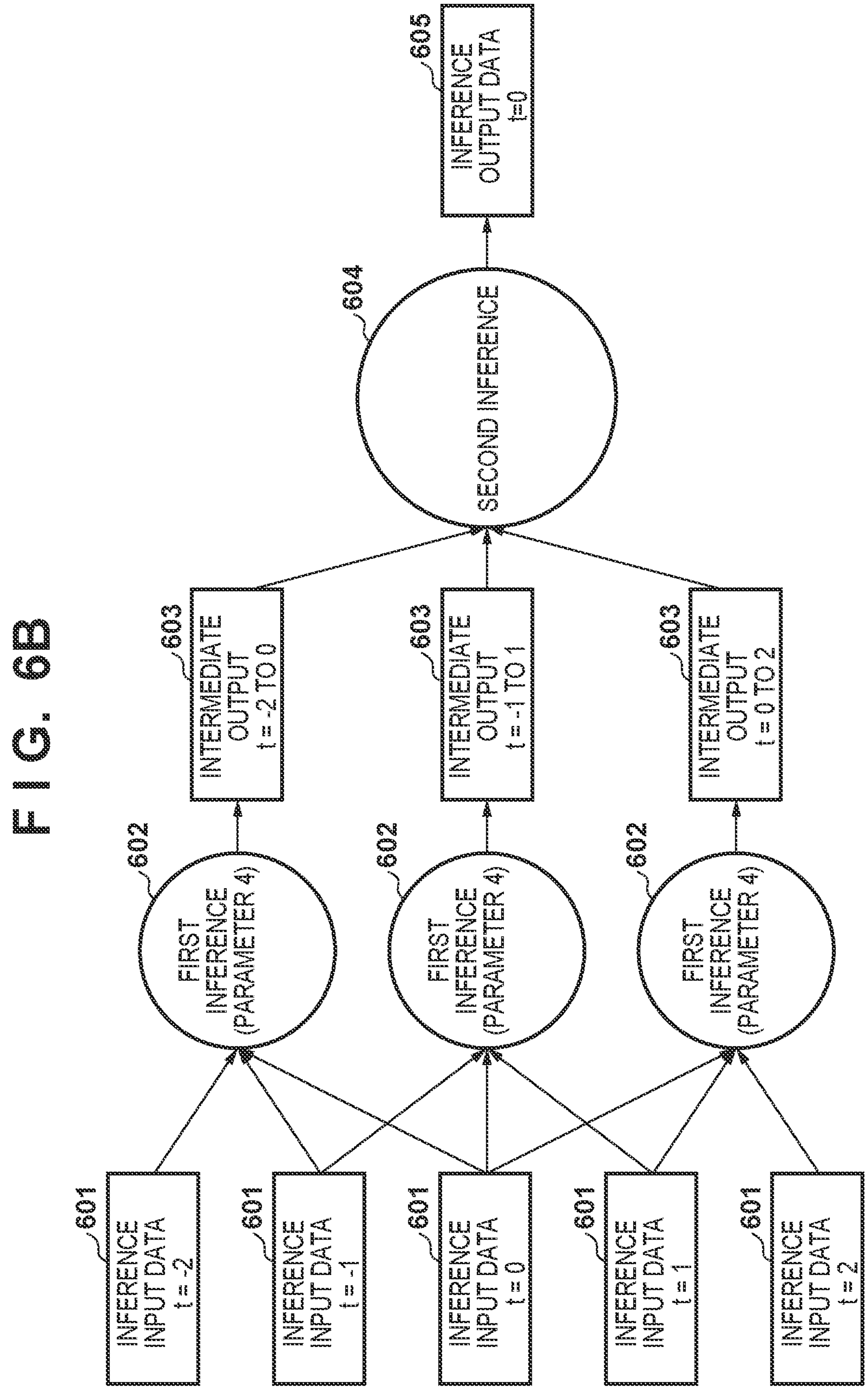
F I G. 6B
601
INFERENCE INPUT DATA t = -2
601
INFERENCE INPUT DATA t = -1
601
INFERENCE INPUT DATA t = 0
601
INFERENCE INPUT DATA t = 1
601
INFERENCE INPUT DATA t = 2
602
FIRST INFERENCE (PARAMETER 4)
602
FIRST INFERENCE (PARAMETER 4)
602
FIRST INFERENCE (PARAMETER 4)
603
INTERMEDIATE OUTPUT t = -2 TO 0
603
INTERMEDIATE OUTPUT t = -1 TO 1
603
INTERMEDIATE OUTPUT t = 0 TO 2
604
SECOND INFERENCE
605
INFERENCE OUTPUT DATA t=0

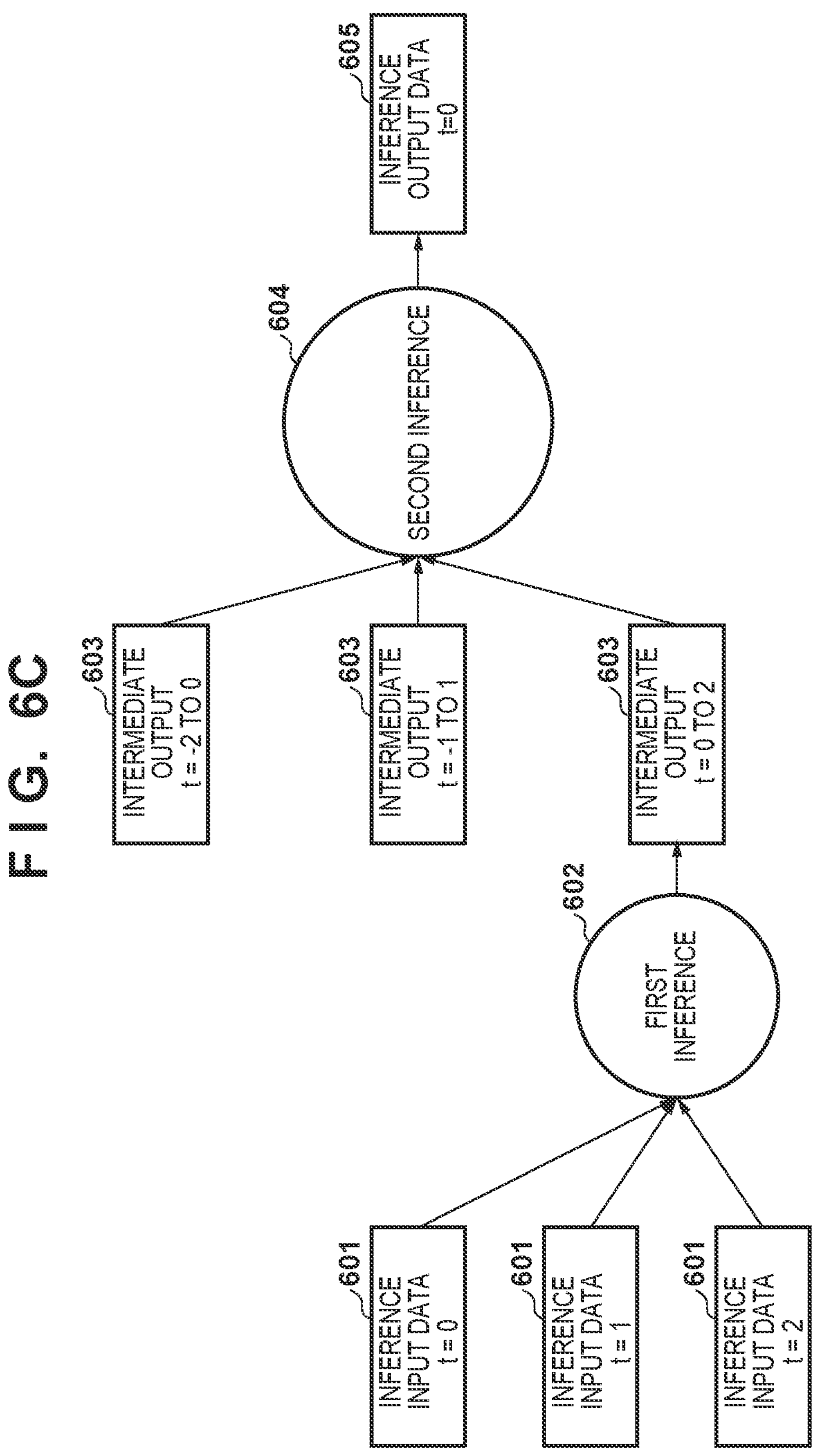
F I G. 6C
601
INFERENCE INPUT DATA t = 0
601
INFERENCE INPUT DATA t = 1
601
INFERENCE INPUT DATA t = 2
602
FIRST INFERENCE
603
INTERMEDIATE OUTPUT t = -2 TO 0
603
INTERMEDIATE OUTPUT t = -1 TO 1
603
INTERMEDIATE OUTPUT t = 0 TO 2
604
SECOND INFERENCE
605
INFERENCE OUTPUT DATA t=0

FIG. 6D

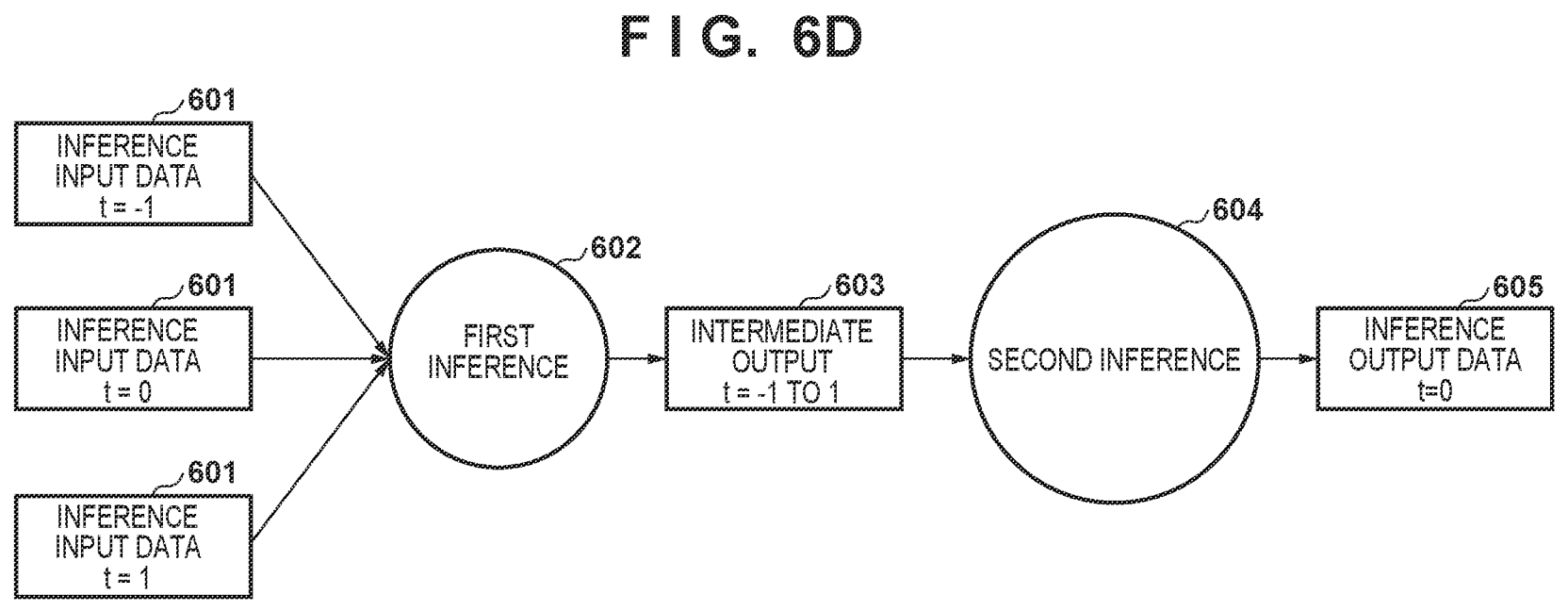

601 INFERENCE INPUT DATA t = -1

601 INFERENCE INPUT DATA t = 0

601 INFERENCE INPUT DATA t = 1

602 FIRST INFERENCE

603 INTERMEDIATE OUTPUT t = -1 TO 1

604 SECOND INFERENCE

605 INFERENCE OUTPUT DATA t=0

| CON-FIGURATION | ACCURACY | MEMORY USAGE | TRAINING TIME | INFERENCE COMPUTATION LOAD | DEPENDENCE ON PREVIOUS INFERENCE |
|---|---|---|---|---|---|
| A | ○ HIGH | × LARGE | × LONG | × HIGH | ○ NONE |
| B | △ MEDIUM | △ MEDIUM | △ MEDIUM | × HIGH | ○ NONE |
| C | △ MEDIUM | △ MEDIUM | △ MEDIUM | △ MEDIUM | × YES |
| D | × LOW | ○ LOW | △ MEDIUM | △ MEDIUM | ○ NONE |
| E | × LOW | ○ LOW | ○ SHORT | ○ LOW | ○ NONE |

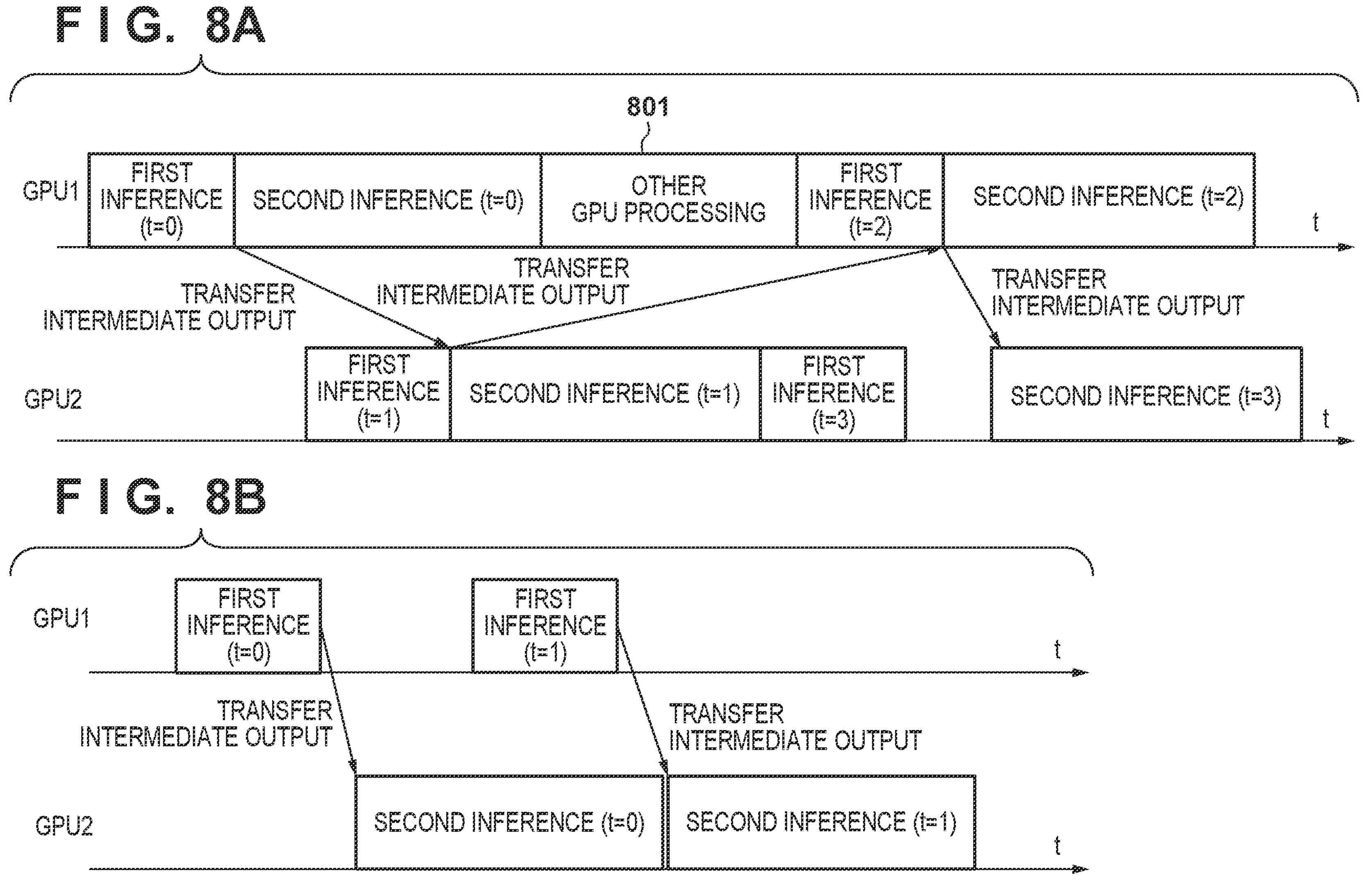
FIG. 8A
801
GPU1
FIRST INFERENCE (t=0)
SECOND INFERENCE (t=0)
OTHER GPU PROCESSING
FIRST INFERENCE (t=2)
SECOND INFERENCE (t=2)
t
TRANSFER INTERMEDIATE OUTPUT
TRANSFER INTERMEDIATE OUTPUT
TRANSFER INTERMEDIATE OUTPUT
GPU2
FIRST INFERENCE (t=1)
SECOND INFERENCE (t=1)
FIRST INFERENCE (t=3)
SECOND INFERENCE (t=3)
t
FIG. 8B
GPU1
FIRST INFERENCE (t=0)
FIRST INFERENCE (t=1)
t
TRANSFER INTERMEDIATE OUTPUT
TRANSFER INTERMEDIATE OUTPUT
GPU2
SECOND INFERENCE (t=0)
SECOND INFERENCE (t=1)
t

FIG. 9B

F I G. 9C
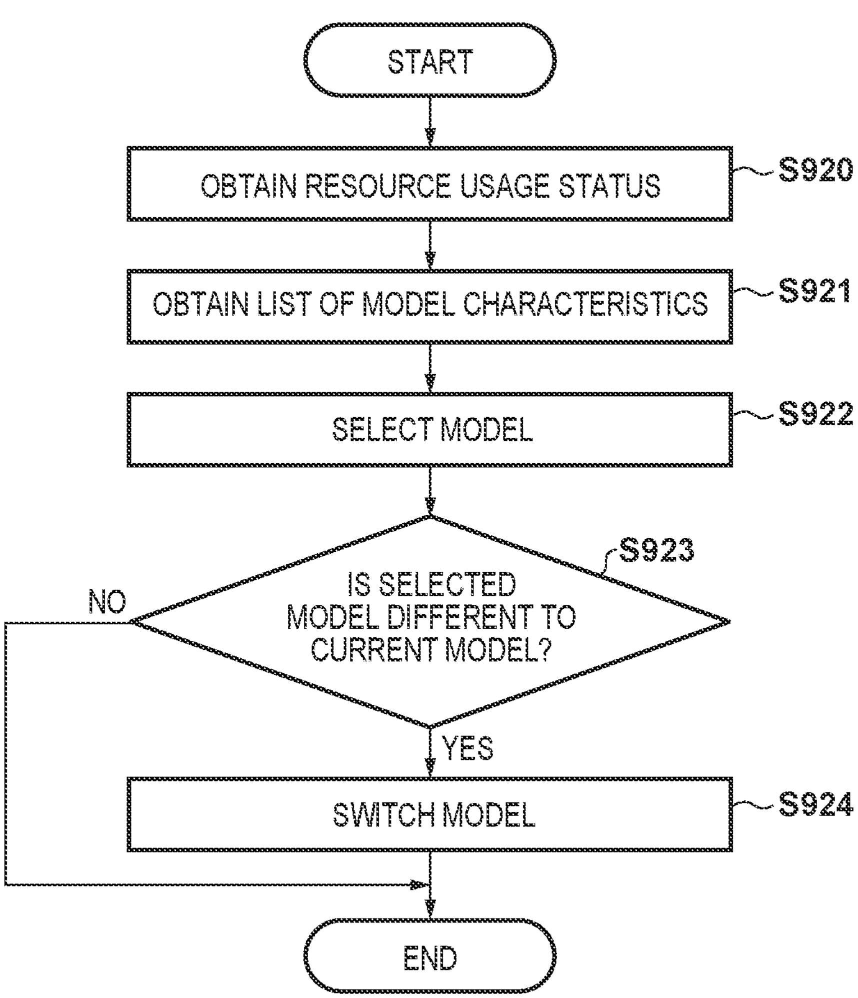

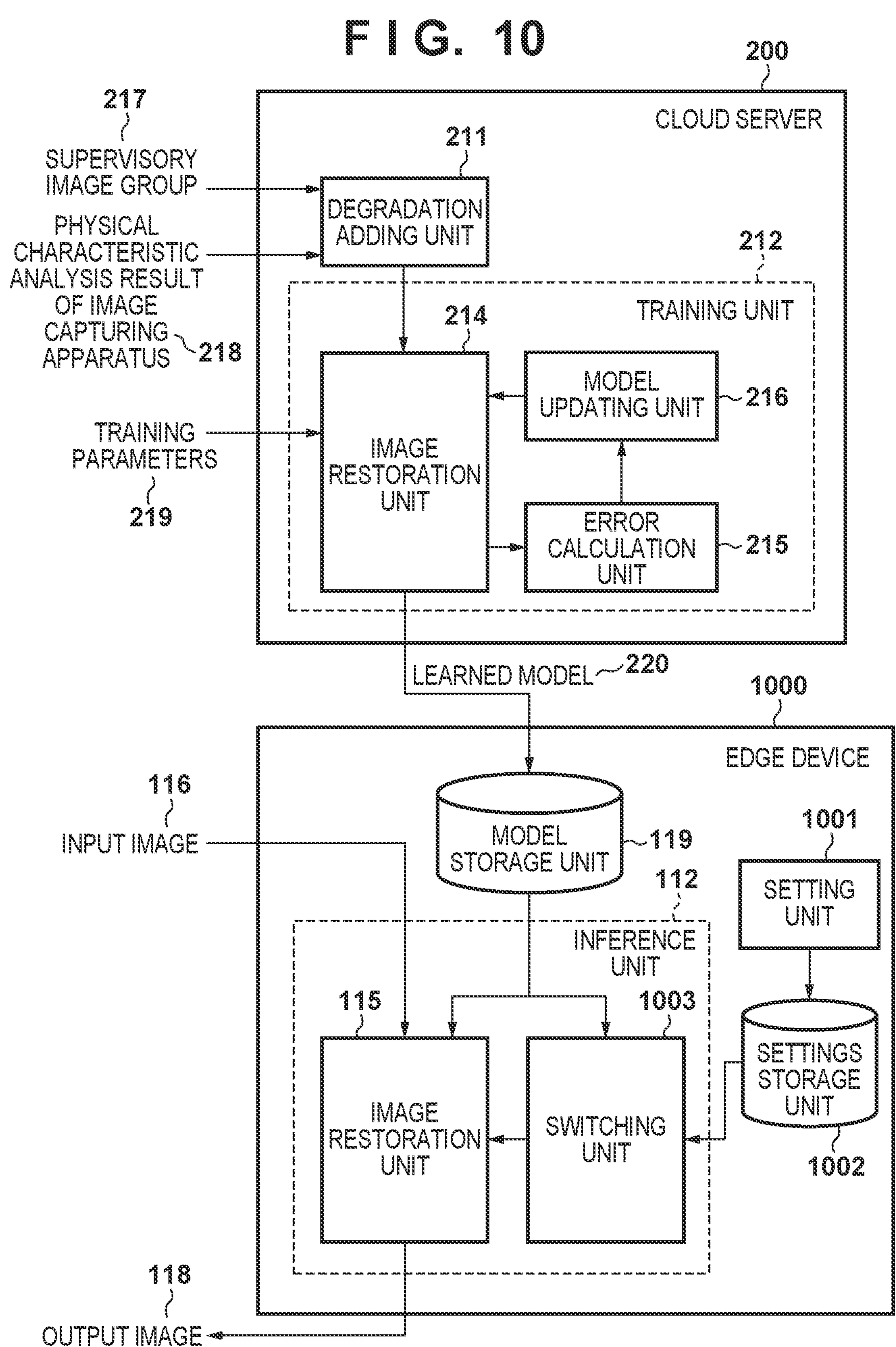

F I G. 10
200
CLOUD SERVER
217
SUPERVISORY IMAGE GROUP
211
DEGRADATION ADDING UNIT
PHYSICAL CHARACTERISTIC ANALYSIS RESULT OF IMAGE CAPTURING APPARATUS
218
212
TRAINING UNIT
214
IMAGE RESTORATION UNIT
MODEL UPDATING UNIT
216
TRAINING PARAMETERS
219
ERROR CALCULATION UNIT
215
LEARNED MODEL
220
1000
EDGE DEVICE
116
INPUT IMAGE
MODEL STORAGE UNIT
119
1001
SETTING UNIT
112
INFERENCE UNIT
115
1003
IMAGE RESTORATION UNIT
SWITCHING UNIT
SETTINGS STORAGE UNIT
1002
118
OUTPUT IMAGE

F I G. 12A
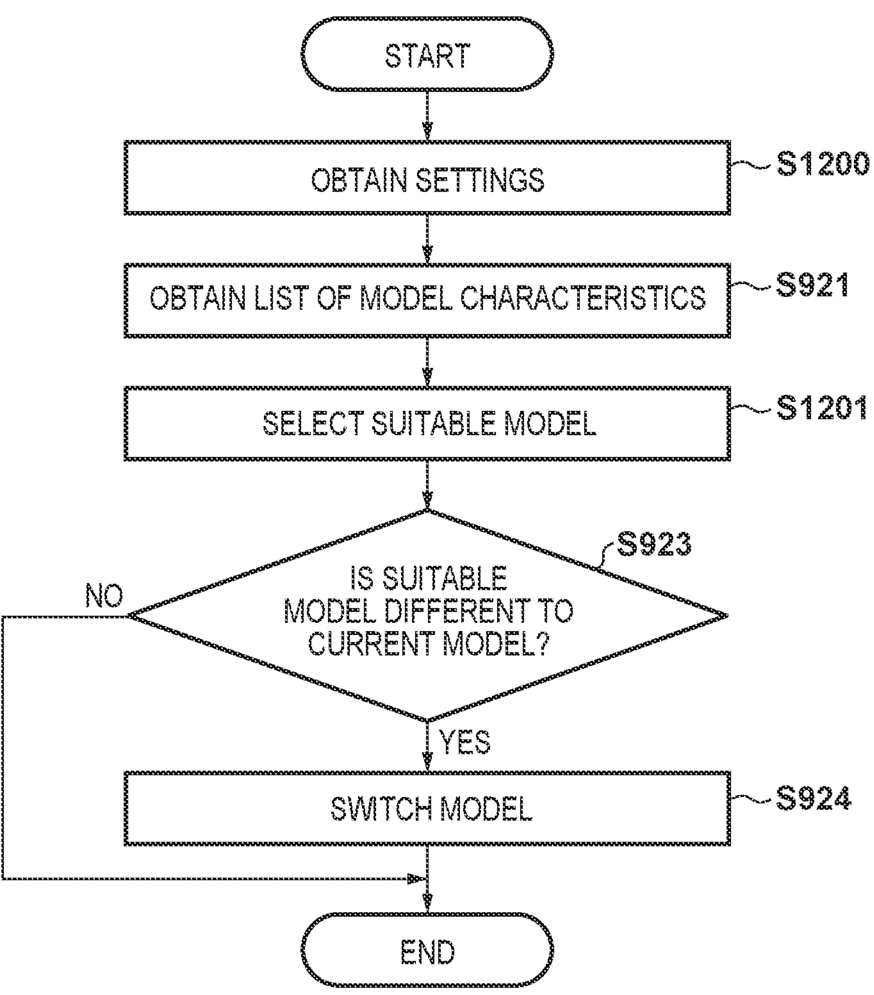

1350
CLOUD SERVER
1354
TRAINING UNIT
1353
1356
1351
TRAINING DATA
MODEL UPDATING UNIT
CLASSIFICATION UNIT
1355
1352
TRAINING PARAMETERS
ERROR CALCULATION UNIT
LEARNED MODEL
220
1300
EDGE DEVICE
1303
OBJECT FEATURE
MODEL STORAGE UNIT
119
1301
INFERENCE UNIT
1302
113
CLASSIFICATION UNIT
SWITCHING UNIT
1304
CLASSIFICATION RESULT

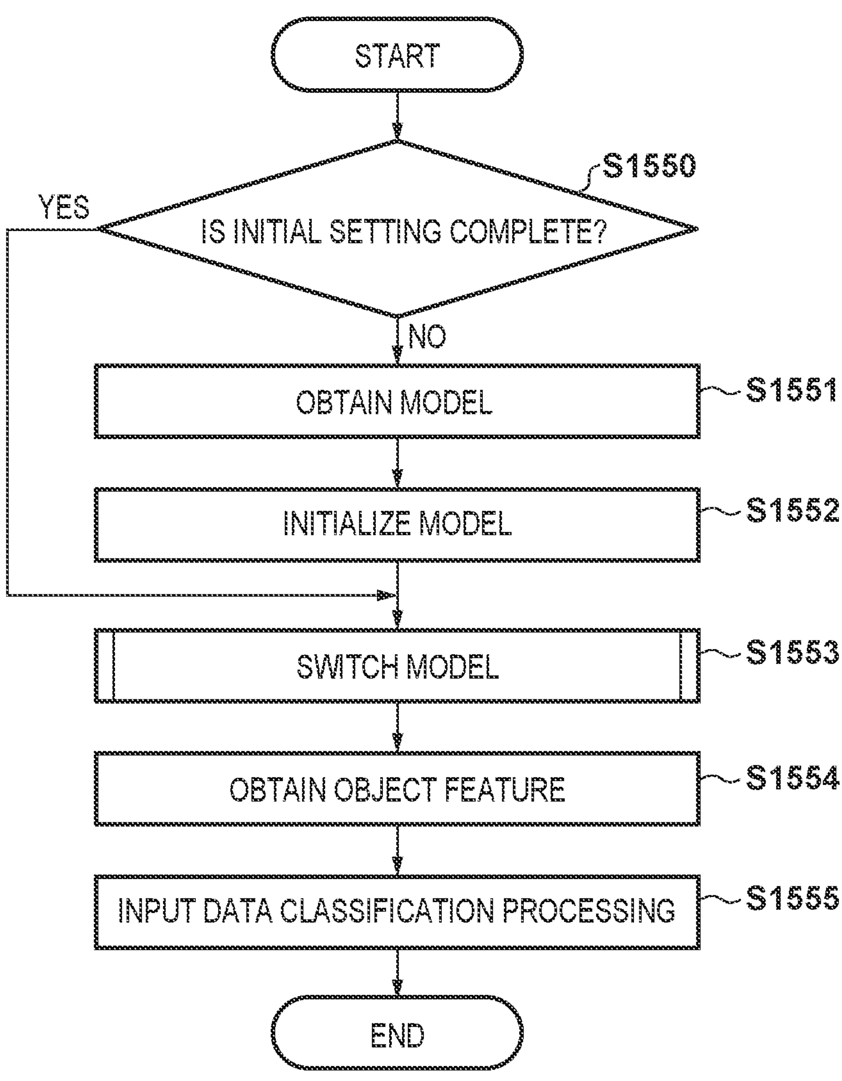
F I G. 15B
START
S1550
IS INITIAL SETTING COMPLETE?
YES
NO
OBTAIN MODEL
S1551
INITIALIZE MODEL
S1552
SWITCH MODEL
S1553
OBTAIN OBJECT FEATURE
S1554
INPUT DATA CLASSIFICATION PROCESSING
S1555
END

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

In recent years, machine learning is being applied to various information processing application programs. There are various types of information processing utilizing machine learning, e.g., image processing for restoring degraded images or classification for determining the types of objects in an image.

"FastDVDnet: Towards Real-Time Deep Video Denoising Without Flow Estimation", Matias, Tassano; Julie, Delon; Thomas, Veit, Proceedings of the IEEE/CVF Conference on Computer Vision and Pattern Recognition (CVPR), 2020, pp. 1354-1363, discloses a method for removing noise from a moving image using a model having a two-stage configuration, including a first noise removal unit and a second noise removal unit. Meanwhile, Japanese Patent Laid-Open No. 2021-77129 discloses a method for performing recognition processing using a plurality of apparatuses having different levels of computational performance. According to Japanese Patent Laid-Open No. 2021-77129, a response time required for data recognition is calculated, and if the response time appears to exceed a threshold, the model is switched to a faster model.

SUMMARY OF THE INVENTION

According to one embodiment of the present application, an information processing apparatus comprises: at least one processor; and a memory coupled to the at least one processor, the memory storing instructions that, when executed by the at least one processor, cause the at least one processor to: perform inference on an input using a first machine learning model; and select a second machine learning model, in which at least some of components of a network structure of the first machine learning model have been changed, as a machine learning model used for the inference, in response to a predetermined condition being satisfied, wherein the first machine learning model has a first component and a second component, and the second machine learning model has at least a component in which a parameter or a path between nodes in the first component or the second component has been changed.

According to another embodiment of the present application, an information processing method comprises: performing inference on an input using a first machine learning model; and selecting a second machine learning model, in which at least some of components of a network structure of the first machine learning model have been changed, as a machine learning model used for the inference, in response to a predetermined condition being satisfied, wherein the first machine learning model has a first component and a second component, and the second machine learning model has at least a component in which a parameter or a path between nodes in the first component or the second component has been changed.

According to yet another embodiment of the present application, a non-transitory computer readable storage medium stores program that, when executed by a computer causes the computer to perform an information processing method comprising: performing inference on an input using a first machine learning model; and selecting a second machine learning model, in which at least some of components of a network structure of the first machine learning model have been changed, as a machine learning model used for the inference, in response to a predetermined condition being satisfied, wherein the first machine learning model has a first component and a second component, and the second machine learning model has at least a component in which a parameter or a path between nodes in the first component or the second component has been changed.

Further features of the present invention will become apparent from the following description of exemplary embodiments (with reference to the attached drawings).

BRIEF DESCRIPTION OF THE DRAWINGS

FIG. 1 is a block diagram illustrating an example of the configuration of an information processing system according to a first embodiment.

FIG. 2 is a block diagram illustrating an example of the functional configuration of an information processing apparatus according to the first embodiment.

FIG. 6A is a diagram illustrating an example of the network structure of a model according to the first embodiment.

FIG. 6B is a diagram illustrating an example of the network structure of a model according to the first embodiment.

FIG. 6C is a diagram illustrating an example of the network structure of a model according to the first embodiment.

FIG. 6D is a diagram illustrating an example of the network structure of a model according to the first embodiment.

FIGS. 8A and 8B are diagrams illustrating processing for performing inference using a plurality of GPUs according to the first embodiment.

FIG. 9B is a flowchart illustrating an example of restoration processing according to the first embodiment.

FIG. 9C is a flowchart illustrating an example of model switching processing according to the first embodiment.

FIG. 10 is a block diagram illustrating an example of the functional configuration of an information processing apparatus according to a second embodiment.

FIG. 12A is a flowchart illustrating an example of model switching processing according to the second embodiment.

FIG. 15B is a flowchart illustrating an example of classification processing according to the third embodiment.

DESCRIPTION OF THE EMBODIMENTS

Figures 3A, 3B:
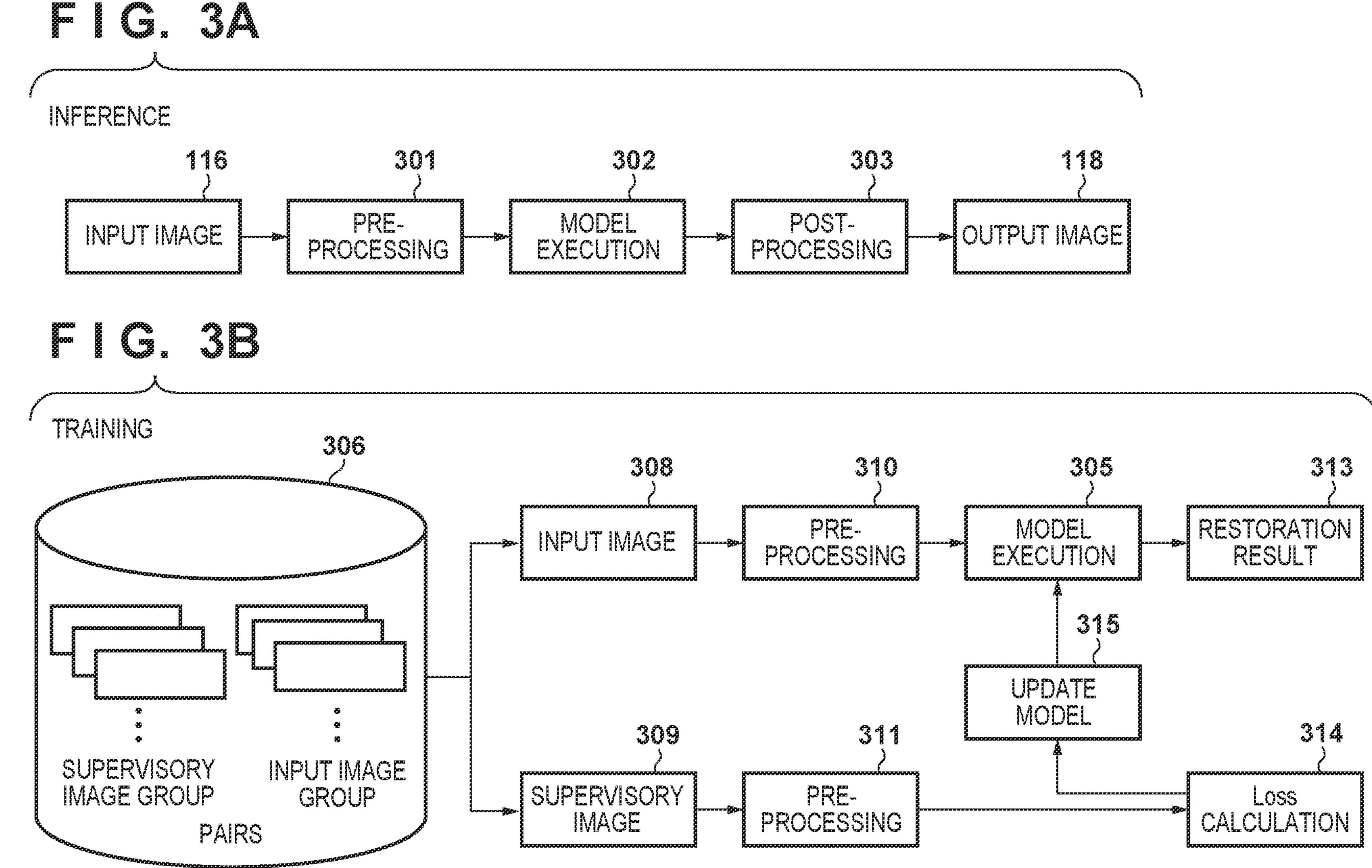
FIGS. 3A and 3B are diagrams illustrating training processing in the information processing apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

There is a need to switch models according to the execution environment. For example, depending on the usage state of resources in the model execution environment such as the CPU/GPU, a user may wish to switch between a high-accuracy but high-load, low-speed model and a low-load, high-speed but low-accuracy model. However, the method disclosed in Japanese Patent Laid-Open No. 2021-77129 has a problem in that it is necessary to initialize the model to be used when switching models, and the switch may therefore take a long time.

An object of the present invention is to switch between machine learning models faster.

An information processing apparatus according to embodiments performs inference on an input using a first machine learning model. Then, in response to a predetermined condition being satisfied, the information processing apparatus switches the machine learning model used for inference to a second machine learning model by switching the components in the network structure of the first machine learning model.

Convolutional Neural Network

The Convolutional Neural Network (CNN), which is used in a broad range of information processing technologies that apply deep learning and which is used in the following embodiments, will be described first. CNN is a mathematical model that repeats nonlinear operations after convolving filters generated through training or learning on image data. In a CNN, the data obtained by the nonlinear operations after convolving the input image data with a filter is called a feature map. The CNN is trained using training data (training images or data sets) constituted by pairs of input image data and output image data. In other words, using training data to generate filter values that can be converted from input image data to corresponding output image data with high accuracy is called "training".

If the image data has RGB color channels, the feature map is constituted by multiple pieces of image data, or the like, the filter used for convolution has a plurality of channels in accordance therewith. In a CNN, the processing of nonlinear operations after convolving filters with image data (or feature maps) is expressed in units of layers, e.g., a feature map in an n-th layer or a filter in an n-th layer. For example, a CNN having a three-layer network structure repeats filter convolution and nonlinear operations three times. Such nonlinear operation processing can be formulated as in Formula (1) below.

$$X_n^{(l)} = f\left(\sum_{n=1}^{N} W_n^{(l)} * X_{n-1}^{(l)} + b_n^{(l)}\right) \quad \text{Formula (1)}$$

In Formula (1), $W_n$ represents the filter in the n-th layer; $b_n$, a bias of the n-th layer; f, a nonlinear operator; $X_n$, the feature map in the n-th layer; and *, a convolution operator. Note that (1) represents the 1-th filter or feature map. The filters and biases are generated by training and are collectively referred to as "network parameters". A sigmoid function or Rectified Linear Unit (ReLU) is used for the nonlinear operation, for example. When ReLU is used, the nonlinear operation processing in a CNN can be given by the following Formula (2), for example.

$$f(X) = \begin{cases} X & \text{if } 0 \le X \\ 0 & \text{otherwise} \end{cases} \quad \text{Formula (2)}$$

As indicated by Formula (2), negative elements of an input vector X are zero, and elements greater than or equal to zero are left unchanged.

The Residual Network (ResNet), for the field of image recognition, and the application thereof in the field of super-resolution, RED-Net, can be given as examples of networks that utilize a CNN. In both of these, a high level of recognition accuracy is made possible by making the CNN multilayered and performing filter convolution many times. For example, ResNet features a network structure provided with shortcut paths through the convolutional layers, resulting in a 152-layer multilayer network that achieves recognition with accuracy that approaches human recognition rates. Multilayer CNNs improve recognition accuracy by repeating nonlinear operations many times to express nonlinear relationships between inputs and outputs.

CNN Training

CNN training will be described next. A CNN is trained by minimizing an objective function expressed, for example, by the following Formula (3) for training data constituted by pairs of input image data and corresponding ground truth output image (supervisory image) data.

$$L(\theta) = \frac{1}{n}\sum_{i=1}^{n} \|F(X_i;\theta) - Y_i\|_2^2 \quad \text{Formula (3)}$$

In Formula (3), L represents a loss function that measures the error between the ground truth and the inference result. $Y_i$ represents the i-th ground truth output image data, and $X_i$ represents the i-th input image data. F is a function that collectively represents the operations performed at each layer of the CNN (Formula (1)). θ represents the network parameters (filter and bias). $\|Z\|_2$ represents the L2 norm, i.e., the square root of the sum of squares of the elements of a vector Z. n represents the number of data sets in the training data. Since the number of pieces of training data is generally high, in Stochastic Gradient Descent (SGD), some of the training data is selected at random for use in the training. Various methods are known for minimizing (optimizing) the objective function, such as the momentum method, AdaGrad method, AdaDelta method, or Adam method. The Adam method can be given by Formula (4).

$$g = \frac{\partial L}{\partial \theta_i^t} \quad \text{Formula (4)}$$

$$m_t = \beta_1 m_{t-1} + (1-\beta_1)g$$

$$v_t = \beta_2 v_{t-1} + (1-\beta_2)g^2$$

$$\theta_i^{t+1} = \theta_i^t - \alpha\frac{\sqrt{1-\beta_2}}{(1-\beta_1)}\frac{m_t}{\sqrt{v_t+\varepsilon}}$$

In Formula (4), t represents the value of a t-th iteration. $\theta_i^t$ represents the i-th network parameter at the t-th iteration, and g represents the gradient of the loss function L with respect to $\theta_i^t$. m and v represent moment vectors, $\alpha$ represents a base learning rate, $\beta 1$ and $\beta 2$ represent hyperparameters, and $\varepsilon$ represents a small constant. The method for optimization in the training is not limited thereto, and any publicly-known optimization technique can be applied. It is known that there are differences in the convergences of these methods, which produce different training times, and the optimization method can be selected according to the desired conditions.

The embodiments assume that information processing (image processing) for restoring a degraded image is performed using the CNN described above. Image degradation factors in this degraded image include, for example, degradation such as noise, blur, aberration, compression, low resolution, defects, and the like, as well as degradation such as a drop in contrast due to the effects of weather such as fog, haze, snow, and rain at the time of shooting. Image processing for restoring degraded images includes noise removal, blur removal, aberration correction, correction of degradation caused by compression, super-resolution processing for low-resolution images, defect compensation, and processing for correcting a drop in contrast caused by weather conditions at the time of shooting. The degraded image restoration processing according to the embodiments is processing for restoring an image by generating an image having no (or very little) degradation from an image having degradation, and will be referred to as image restoration (processing) in the following descriptions. In other words, image restoration in the embodiments includes not only processing for restoring of an image which itself has no (or little) degradation but which has been degraded by subsequent amplification, compression/decompression, or other image processing, but also processing for making it possible to reduce degradation in the original image itself.

Here, when using neural network-based image restoration processing, the expressive capabilities of the network are generally expected to be improved, and more accurate image restoration achieved, when a neural network having more parameters is used. On the other hand, more parameters lead to an increase in the number of operations, which increases the inference time and the amount of memory required for inference. The model that should be used in the image restoration processing therefore depends on the amount and usage state of the computational resources of the information processing apparatus performing the inference.

First Embodiment

A first embodiment will describe a method of switching the model that performs image restoration processing without reinitialization. The present embodiment will describe noise as an example of an image degradation factor, and processing for performing noise reduction processing as the image restoration processing.

Example of Configuration of Information Processing System

FIG. 1 is an example of an information processing system configuration including an information processing apparatus according to the first embodiment. In the information processing system illustrated in FIG. 1, a cloud server 200, which is responsible for generating training data and training for restoring image degradation, and an information processing apparatus 100 (an edge device 100), which is responsible for performing image restoration on an image to be processed, are communicatively connected to each other over the Internet or the like. In the following, the generation of training data and the training for restoring image degradation performed by the cloud server 200 will be referred to as "restoration training", and restoration of a degraded image performed by the information processing apparatus 100 will be referred to as "restoration inference". Note that although the present embodiment assumes that the cloud server 200 and the information processing apparatus 100 are separate apparatuses, the information processing apparatus 100 may perform the restoration training processing described as being performed by the cloud server 200.

Hardware Configuration of Information Processing Apparatus

The information processing apparatus 100 obtains an image to be processed, and takes the obtained image as an input image to be input to a machine learning model that performs restoration inference. In the present embodiment, the information processing apparatus 100 may obtain RAW image data (in a Bayer array) input from an image capturing apparatus 10 as the input image subject to the image restoration processing. The image is not limited to any particular image format, such as the color space, and any format can be used. For example, this image may be image data in another color filter array, or may be a demosaiced RGB image or a YUV-converted image.

The information processing apparatus 100 performs restoration processing on a degraded image using a machine learning model, taking the input image to be processed as an input. The information processing apparatus 100 according to the present embodiment can perform restoration inference using a trained neural network model provided by the cloud server 200. In other words, the information processing apparatus 100 can be an information processing apparatus that reduces noise in RAW image data by executing a pre-installed information processing application program using a model provided by the cloud server 200.

The information processing apparatus 100 includes a CPU 101, a RAM 102, a ROM 103, a mass storage apparatus 104, a general-purpose interface (I/F) 105, and a network I/F 106, and these components are connected to each other by a system bus 107. The information processing apparatus 100 is also connected to the image capturing apparatus 10, an input apparatus 20, an external storage apparatus 30, and a display apparatus 40 via the general-purpose I/F 105.

Using the RAM 102 as a work memory, the CPU 101 executes programs stored in the ROM 103, and comprehensively controls each component in the information processing apparatus 100 via the system bus 107. The mass storage apparatus 104 is an HDD or an SSD, for example, and stores various types of data, image data, and so on handled by the information processing apparatus 100. The CPU 101 writes data to the mass storage apparatus 104, and reads out data stored in the mass storage apparatus 104, via the system bus 107. The general-purpose I/F 105 is a serial bus interface, such as USB, IEEE 1394, or HDMI (registered trademark), for example. The information processing apparatus 100 obtains data from the external storage apparatus 30 (e.g., various types of storage media such as a memory card, a CF card, an SD card, or a USB memory) via the general-purpose I/F 105.

The information processing apparatus 100 accepts user instructions from the input apparatus 20, which is a mouse or keyboard or a mobile terminal such as a smartphone, via the general-purpose I/F 105. The information processing apparatus 100 also outputs image data and the like processed by the CPU 101 to the display apparatus 40 (e.g., various types of image display devices, such as a liquid crystal display) via the general-purpose I/F 105. The display apparatus 40 can also function as the input apparatus 20 as a display apparatus integrated with a touch panel. The information processing apparatus 100 obtains the data of a captured image (RAW image) subject to the noise reduction processing from the image capturing apparatus 10 via the general-purpose I/F 105. The network I/F 106 is an interface for connecting to the Internet. The information processing apparatus 100 can obtain the trained model for restoration inference by accessing the cloud server 200 through an installed web browser.

Hardware Configuration of Cloud Server

The cloud server 200 provides a machine learning model for performing restoration processing on a degraded image input to the information processing apparatus 100. The cloud server 200 according to the present embodiment is a server that provides a cloud service over the Internet. More specifically, the cloud server 200 generates training data and performs restoration training, and generates a trained machine learning model (a trained model) that stores network parameters and a network structure that are a result of the training. The cloud server 200 then provides the trained model in response to a request from the information processing apparatus 100. Hereinafter, the term "model" will be assumed to refer to this trained model.

The cloud server 200 includes a CPU 201, a ROM 202, a RAM 203, a mass storage apparatus 204, and a network I/F 205, and these components are connected to each other by a system bus 206. The CPU 201 controls the overall operations by reading out control programs stored in the ROM 202 and executing various types of processing. The RAM 203 is used as the main memory of the CPU 201, a temporary storage region such as a work area, or the like. The mass storage apparatus 204 is a high-capacity secondary storage device, such as an HDD or an SSD, in which image data or various types of programs are stored. The network I/F 205 is an interface for connecting to the Internet, and provides the trained model, which stores the network parameters and the network structure described above, in response to a request from the web browser of the information processing apparatus 100.

The present embodiment assumes that the information processing apparatus 100 downloads the trained model, which is the result of generating the training data and performing restoration training, from the cloud server 200, and performs restoration inference on the input image data to be processed. The components of the information processing apparatus 100 and the cloud server 200 that execute such processing may be realized by configurations other than those described above. For example, the functions handled by the cloud server 200 may be subdivided, and the generation of the training data and the restoration training may be executed by different apparatuses. Alternatively, the configuration may be such that the image capturing apparatus 10 provided with a combination of the functions of the information processing apparatus 100 and the cloud server 200 performs all of the operations for generating the training data, performing restoration training, and performing restoration inference.

Function Blocks of Overall System

The overall functional configuration of the information processing system according to the present embodiment will be described next with reference to FIG. 2. As illustrated in FIG. 2, the information processing apparatus 100 includes an inference unit 112 and a model storage unit 119. The model storage unit 119 obtains a trained model 220 from the cloud server 200 and stores the model. The inference unit 112 has a function for image restoration processing for restoring a degraded image. The inference unit 112 includes an image restoration unit 115 and a switching unit 113 for inference.

The image restoration unit 115 inputs a degraded image into the trained model 220 and restores the image. Here, processing performed by the image restoration unit 115 will be described with reference to FIG. 3A. The image restoration unit 115 obtains input image data 116 and executes pre-processing 301. The pre-processing 301 is processing performed before the input image data 116 is input to the trained model 220, and is, assuming the input image data is 14-bit integer values in a Bayer array, processing for converting each piece of data to a floating point number and normalizing the values to 0.0 to 1.0. Next, the image restoration unit 115 performs model execution 302 using the trained model 220, taking the data after the pre-processing 301 as the input. The image restoration unit 115 performs post-processing 303 on the result of the model execution 302 and obtains an output image 118. The post-processing 303 is processing performed on the output of the trained model 220, and is, when the model output result data is a floating point number, processing for converting the values to 14-bit integer values, for example.

Figure 4:
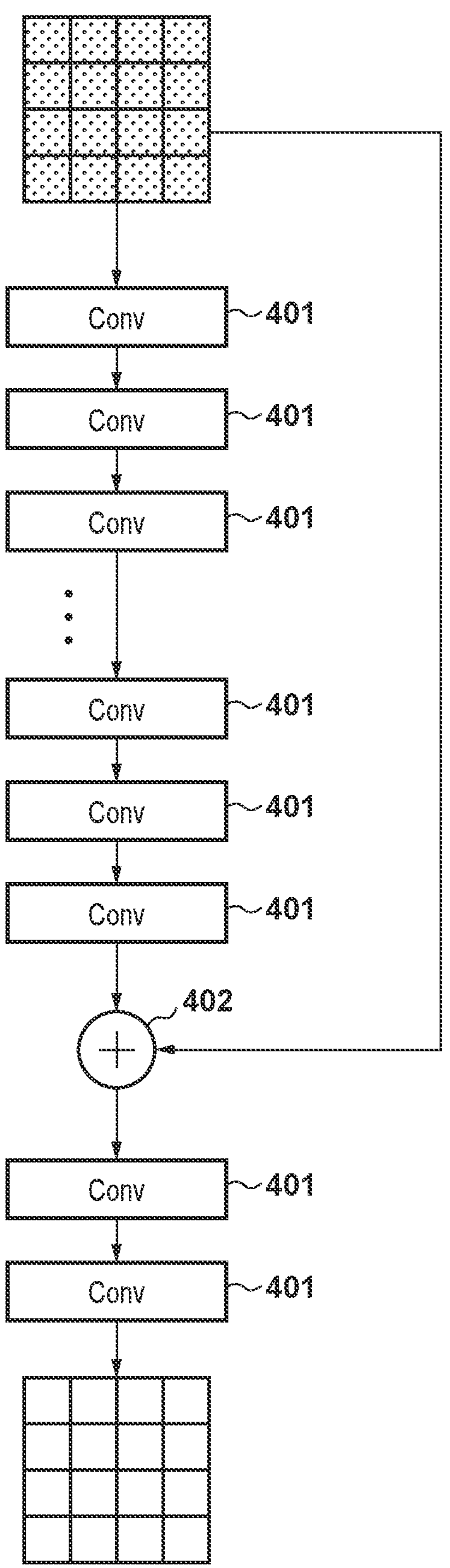
FIG. 4 is a diagram illustrating an example of the configuration of a model used by the information processing apparatus according to a first embodiment.

FIG. 4 is an example of the model structure. In this example, the model is constituted by a plurality of convolution layers 401 and connected layers 402. In the convolution layers 401, the convolution operation by the filter expressed by Formula (1) above and the nonlinear operation expressed by Formula (2) are repeated multiple times. The image restoration unit 115 applies the convolution layers 401 sequentially to the input data of the model and calculates a feature map. The image restoration unit 115 then connects the feature map and input data in the channel direction through the connected layers 402. Furthermore, the image restoration unit 115 applies the convolution layers 401 sequentially to the connection results and outputs a results from the final layer. The processing illustrated in FIG. 4 is processing commonly performed by CNNs and will therefore not be described in detail. The image restoration unit 115 performs restoration inference on the input image data 116 using the trained model 220 received from the cloud server 200.

The switching unit 113 switches the trained model 220, with which the image restoration unit 115 executes the inference, from a first machine learning model to a second machine learning model by switching the components of the network structure when a predetermined condition is satisfied. Hereinafter, the switching processing by which the switching unit 113 switches the components of the network structure may simply be referred to as "switching (of the model)". Models such as those illustrated in FIGS. 6A to 6E (described later) can be used as the first machine learning model and the second machine learning model, but the configurations thereof will be described later.

The cloud server 200 includes a degradation adding unit 211 and a training unit 212. The degradation adding unit 211 generates a degradation training image for input, which is used to train the restoration inference. For example, the degradation adding unit 211 can generate the degradation training image by adding at least one type of degradation factor to supervisory image data extracted from a group of supervisory images which do not have degradation. In the example of the present embodiment, noise is used as the degradation factor, and the degradation adding unit 211 generates the degradation training image data by adding noise as the degradation factor to the supervisory image data. In the present embodiment, the degradation adding unit 211 may generate the input image data by analyzing the physical characteristics of the image capturing apparatus and adding, to the supervisory image data, noise which corresponds to a degradation amount in a range broader than the degradation amount that can arise in the image capturing apparatus, as the degradation factor. Because there are different ranges for degradation amounts that can arise due to individual differences between image capturing apparatuses, adding a degradation amount in a broader range than the analysis result makes it possible to provide a margin and improve the robustness. Here, the supervisory images may be obtained from the image capturing apparatus 10, or may be obtained from an external device (not shown) over the Internet, for example.

Figure 5:
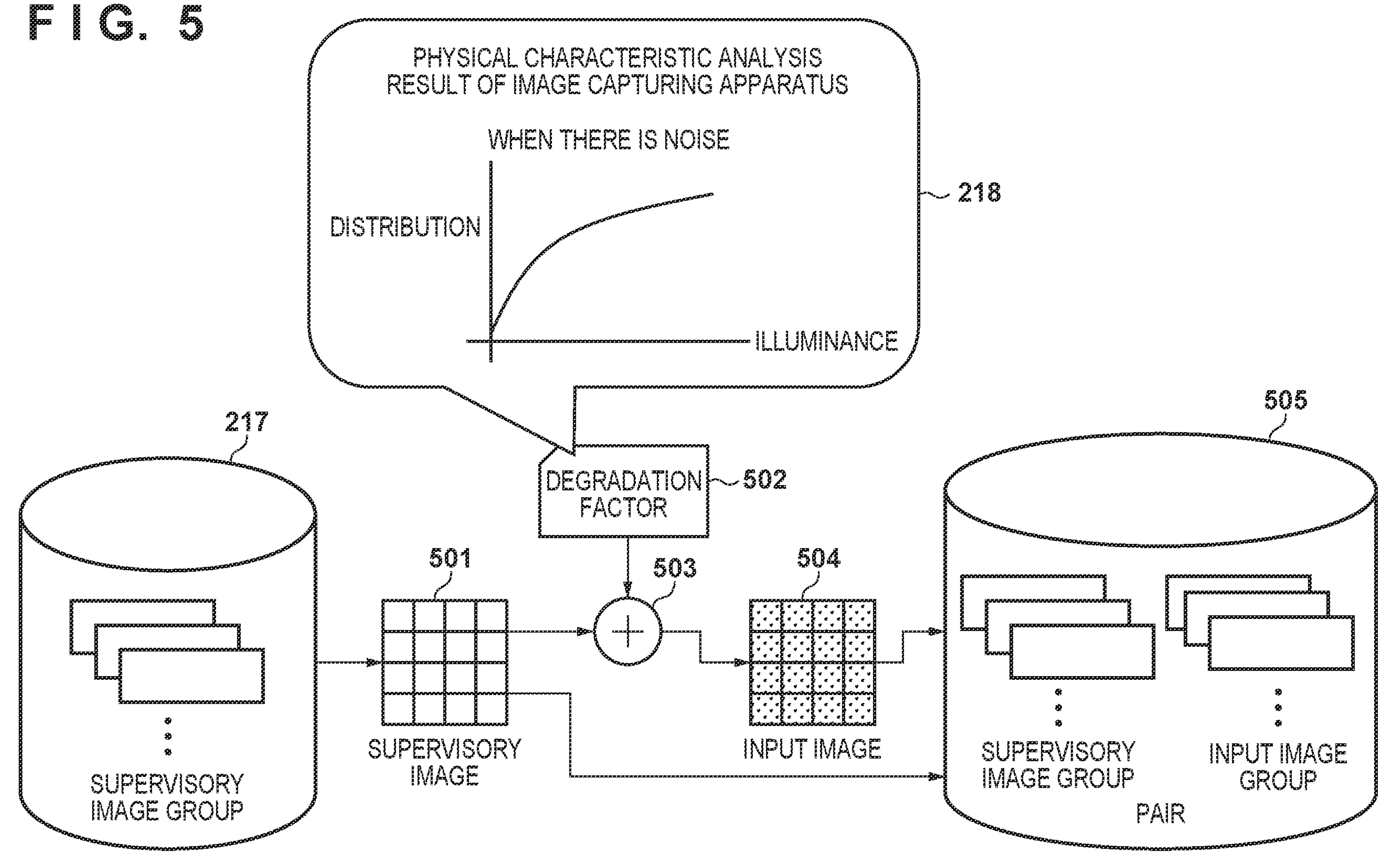
FIG. 5 is a diagram illustrating degradation addition processing according to the first embodiment.

The addition of degradation will be described next with reference to FIG. 5. The degradation adding unit 211 generates degradation training image data 504 through addition 503 of noise, which is based on a physical characteristic analysis result 218 of the image capturing apparatus, as a degradation factor 502, to supervisory image data 501 extracted from a supervisory image group 217. The degradation adding unit 211 adds a pair constituted by the supervisory image data 501 and the degradation training image data 504 to training data 505. The degradation adding unit 211 generates a degradation training image group constituted by a plurality of pieces of the degradation training image data 504 by adding the degradation factor 502 for each piece of the supervisory image data in the supervisory image group 217, and generates the training data 505 using the generated degradation training image group. Although the present embodiment describes noise as an example, the degradation adding unit 211 may add, to the supervisory image data, any one or more of a plurality of types of degradation factors, such as blur, aberration, compression, low resolution, defects, drops in contrast caused by the weather at the time of shooting, and the like, as described earlier.

The supervisory image group 217 contains various types of image data, including, for example, nature photographs containing landscapes and animals, photographs of people such as portraits or sports photographs, photographs of man-made objects such as buildings and products, and the like. The supervisory image data according to the present embodiment is assumed to be RAW image data in which each pixel has a pixel value corresponding to one of the RGB colors, as in the input image data 116. The physical characteristic analysis result 218 of the image capturing apparatus includes, for example, the amount of noise produced by the image sensor built into the camera (image capturing apparatus) at each of sensitivities, the amount of aberration produced by the lens, or the like. These can be used to estimate the degree to which image degradation will arise at each of shooting conditions. In other words, adding the degradation estimated under given shooting conditions to the supervisory image data makes it possible to generate an image equivalent to the image obtained at the time of shooting.

Returning to the description of FIG. 2, the training unit 212 includes an image restoration unit 214, an error calculation unit 215, and a model updating unit 216 for training. The training unit 212 obtains training parameters 219 and performs restoration training using the training data generated by the degradation adding unit 211. The training parameters 219 include initial values of the parameters of the neural network model, the network structure of the model, and hyperparameters indicating an optimization method. The image restoration unit 214 performs image restoration processing on the input image. The error calculation unit 215 calculates error between an image restoration result image output by the image restoration unit 214 and the supervisory image. The model updating unit 216 updates the parameters of the neural network model of the image restoration unit 214 based on the calculated error.

FIG. 3B is a diagram illustrating the flow of the training processing performed by the training unit 212. The image restoration unit 214 performs the image restoration processing through model execution 305, using, as an input, data obtained through pre-processing 310 performed on input image data 308. In the model execution 305, the image restoration unit 214 repeats convolution operations and nonlinear operations with the filters expressed by Formula (1) and Formula (2) multiple times on the model input data, and outputs a restoration result 313. Next, by performing a Loss calculation 314 from data obtained by performing pre-processing 311 on supervisory image data 309 and the restoration result 313, the error calculation unit 215 calculates the error thereof. The model updating unit 216 then executes model updating 315 based on the error calculated by the error calculation unit 215, and updates the network parameters of the model so that the error is reduced (minimized).

Note that the inference processing and training processing described with reference to FIGS. 3A to 5 are examples, and different processing may be performed if the inference and training can be performed in the same way as when using a general CNN. Although the degradation training image is generated by the degradation adding unit 211 in the present embodiment, the training image may be prepared through a different method, such as obtaining the training image from an external device (not shown).

The configuration illustrated in FIG. 2 can be modified or changed as necessary. For example, one functional unit may be divided into a plurality of functional units, or two or more functional units may be integrated into one functional unit.

The configuration illustrated in FIG. 2 may be realized by more than one device. In this case, the devices are connected via a circuit or a wired or wireless network, and operate cooperatively by communicating data with each other to realize the processing according to the present embodiment.

The switching unit 113 according to the present embodiment stores a plurality of model candidates for executing restoration inference, and switches the components of the network structure such that inference is performed by a model selected from among the candidates when a predetermined condition is satisfied. FIGS. 6A to 6E are schematic diagrams illustrating the components of the networks in such candidate models. Examples of the network structure of the trained model 220 executed by the image restoration unit 115 will be described hereinafter with reference to FIGS. 6A to 6E.

In the examples in FIGS. 6A to 6E, input data 601 input to the network of the trained model is data obtained by performing the pre-processing 301 on an input image 116 at each time (indicated by "t"). The examples illustrated here are examples in which a plurality of frames are arranged in time series in the input image 116, and output data (t=0) is output for the input image at t=0. Meanwhile, for times relatively before the image at t=0, t has a negative value, and for times relatively after that image, t has a positive value. In FIGS. 6A to 6E, the output image at t=0 is output using five frames of input data, at t=−2 to 2.

The network illustrated in FIG. 6A takes five frames' worth of the input data 601 as an input and outputs one frame's worth of output data 605. This network has a two-stage structure which includes a first inference unit that performs first inference processing 602 and a second inference unit that performs second inference processing 604. First, taking three chronologically consecutive pieces of the input data 601 as a single set, the image restoration unit 115 performs the first inference processing 602 for three sets (t=2 to 0, 1 to 1, and 0 to 3). Next, the image restoration unit 115 inputs intermediate outputs 603, which are the three sets of outputs from the first inference processing 602, into the second inference unit and performs the second inference processing 604, and outputs the output data 605. In the network illustrated in FIG. 6A, the three sets of network parameters in the first inference processing 602 are different from each other.

The network illustrated in FIG. 6B has the same network structure as that illustrated in FIG. 6A, and is also a network that takes five frames' worth of the input data 601 as an input. In the network illustrated in FIG. 6B, the three sets of network parameters in the first inference processing 602 are the same.

The network illustrated in FIG. 6C is a network having the same components as the network illustrated in FIG. 6B in the network structure. In the network illustrated in FIG. 6C, one of the outputs from the first inference processing and the output from a past instance of the first inference processing are input to the second inference unit. In the example illustrated in FIG. 6C, only the last of the three sets in the first inference processing 602 illustrated in FIG. 6B is performed. Then, two of the intermediate outputs 603 input in the second stage, excluding the last set, carry over the inference results output from past (e.g., one previous and two previous) instances of the first inference processing. In other words, the image restoration unit 115 can store the intermediate output t=−1 to 1, obtained as the outputs of the first stage in the previous inference, and the intermediate output t=−2 to 0, obtained as the outputs of the first stage in the inference one previous, and can carry over these intermediate outputs.

The network illustrated in FIG. 6D is a network having only some of the nodes in the network structure illustrated in FIG. 6B. In the network illustrated in FIG. 6D, the image restoration unit 115 inputs three frames' worth of the input data 601 (here, one set, namely t=−1 to 1) and performs the first inference processing 602. Next, the image restoration unit 115 inputs the intermediate output 603, which is the outputs from the first inference processing 602, into the second inference processing 604, and outputs one frame's worth of the output data 605.

Figures 6E, 7:
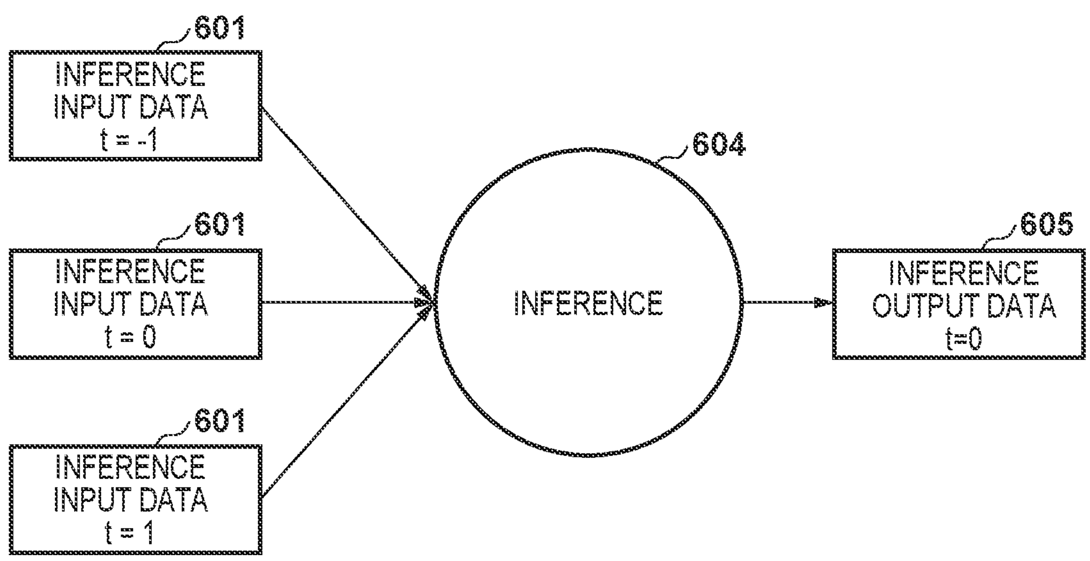
FIG. 6E is a diagram illustrating an example of the network structure of a model according to the first embodiment.
FIG. 7 is a diagram illustrating an example of the characteristics of a model according to the first embodiment.

While the network illustrated in FIGS. 6A to 6D is a two-stage configuration having a first inference unit and a second inference unit, the network illustrated in FIG. 6E is a network having a one-stage configuration. In the network illustrated in FIG. 6E, the image restoration unit 115 inputs three frames' worth of the input data 601 (here, one set, namely t=−1 to 1) and outputs one frame's worth of the output data 605 through inference processing 602. A plurality of pieces of input data 601 and a single piece of output data 605 are used in the examples in FIGS. 6A to 6E. However, the present embodiment is not limited to this example, and the number of pieces of input data and the number of pieces of output data may be one or more, respectively, and the output data 605 may be an output corresponding to a different time in the input data instead of t=0. In addition, although FIGS. 6A to 6E illustrate chronologically continuous data as the input data 601, the data need not be chronologically continuous data. The five types of networks illustrated in FIGS. 6A to 6E have different processing times and require different amounts of resources for the processing. These network structures will be compared next with reference to FIG. 7. Models (A) to (E) are defined in the table in FIG. 7 as corresponding to FIGS. 6A to 6E, respectively, and evaluations of the characteristics of those models are provided for comparison items (or simply "items"). The terms "models (A) to (E)" used hereinafter are assumed to refer to the models indicated in FIGS. 6A to 7.

In this example, for each item in models (A) to (E), a circle is given when an item is relatively good compared to other models; a triangle, when the item is fair; and an x, when the item is poor. Here, "(inference) accuracy", "memory usage", "training time", "inference computation load", and "dependence on previous inference" are used as the items. In the network structure illustrated in FIG. 6A, the parameters of the first inference processing 602 are different from each other. Accordingly, the configuration illustrated in FIG. 6A has higher expressive capabilities and higher accuracy in the network than the configuration illustrated in FIG. 6B. On the other hand, the configuration illustrated in FIG. 6A has a higher number of parameters than the configuration illustrated in FIG. 6B, which results in higher memory usage, longer training time, and higher computational loads for inference. In this manner, the network configurations illustrated in FIGS. 6A to 6E have relative advantages and disadvantages compared to other network configurations, and in FIG. 7, the evaluations have been made such that there is no model in which all items are given circles.

By switching between and running models having different performances as illustrated in FIG. 7, the appropriate model can be used in accordance with the usage state of resources such as a CPU or GPU, for example. For example, it is possible to switch between a high-accuracy but high-load model and a low-load but relatively low-accuracy model. Here, when switching the model, the information processing apparatus 100 according to the present embodiment makes it possible to switch the model more quickly by changing the components of the network structure of the model (e.g., some of the parameters or paths between nodes) without initializing the model. The switching processing will be described later.

The "dependence on previous inference", which is one of the comparison items in FIG. 7, will be described here with reference to FIGS. 8A and 8B. In the present embodiment, the dependence on previous inference is information indicating whether the previous inference and the current inference can be executed independently. The configuration in FIG. 6C carries over the intermediate outputs from the inference one previous and the inference two previous, and there is therefore dependence on previous inference (i.e., the current inference cannot be made without using the inference results of the inference one previous and the inference two previous).

FIGS. 8A and 8B are diagrams illustrating examples of which processing is performed at which timing when executing the model illustrated in FIG. 6C using a plurality of GPUs. In FIG. 8A, the first inference processing 602 and the second inference processing 604 are executed alternately using a GPU 1 and a GPU 2. In the example illustrated in FIG. 8A, the image restoration processing is performed on the input data 601 by the GPU 1 at times t=0 and t=2, and by the GPU 2 at times t=1 and t=3. Here, wait time arises in the image restoration processing at t=2 due to other GPU processing 801 entering between the image restoration processing at time t=0 and the image restoration processing at t=2 by the GPU 1. This wait time delays the start of the first inference processing 602 at t=2, which in turn delays the transfer of the intermediate output 603 to the GPU 2. As a result, the start of the second inference processing 604 by the GPU 2 at t=3 is delayed. In other words, in the example illustrated in FIG. 8A, even if no other GPU processing 801 is being performed in the GPU 2, the delay in the processing by the GPU 1 will produce wait time in the GPU 2 as well, which worsens the processing efficiency of the GPU 2. Likewise, when other GPU processing 801 is performed in the GPU 2, the transfer of the intermediate output 603 to the GPU 1 will be delayed, producing wait time in the GPU 1 as well as worsening the processing efficiency of the GPU 1. In other words, the GPU 1 and the GPU 2 are affected by the delay in both directions.

FIG. 8B is a diagram illustrating an example of processing performed by each GPU when the effect of delay in FIG. 8A has been changed from both directions to one direction. In FIG. 8B, the first inference processing 602 is executed by the GPU 1, and the second inference processing 604 is executed by the GPU 2. The intermediate output 603, which is the output from the first inference processing 602, is required for the second inference processing 604, and thus the intermediate output 603 is transferred from the GPU 1 to the GPU 2. The transfer of the intermediate output 603 is executed between the first inference processing 602 and first inference processing 604 performed on the input data 601 at the same time (e.g., t=0). In other words, the inter-GPU transfer time of the intermediate output 603 is added to the model execution time when the model is executed.

Meanwhile, as illustrated in FIG. 8B, if, when the first inference processing 602 and the second inference processing 604 are executed by different GPUs, the processing times of these instances of inference processing are different, down time in which the other GPU does not perform any processing increases. In the example illustrated in FIG. 8B, the processing time of the second inference processing 604 is longer than that of the first inference processing 602, which increases the down time of the GPU 1 that performs the first inference processing 602 and worsens the processing efficiency. In this manner, delay can occur when inference is performed using a plurality of GPUs, and it is sometimes preferable to use a model that is not dependent on previous inference. Accordingly, in such a case, the switching unit 113 may switch the model used for inference from a model that is dependent on previous inference to the model that is not dependent on previous inference.

The model switching processing performed by the switching unit 113 will be described hereinafter. As described earlier, the information processing apparatus 100 according to the present embodiment switches between and operates models having different performances, such as those illustrated in FIGS. 6A to 6E, in response to a predetermined condition (a switching condition) being satisfied. The switching unit 113 periodically determines whether the switching condition is met (a model switch determination), and switches the model used in the image restoration unit 115 when that the condition is determined to be satisfied (i.e., that a switch is necessary). Here, the frequency at which the model switch determination is made can be set to every certain period of time, such as ten minutes, or each time an inference is made, for example. In the present embodiment, information indicating each model, such as that illustrated in FIGS. 6A to 6E, is stored in the model storage unit 119, and the information is read out from the model storage unit 119 when the model is switched.

In the present embodiment, the switching condition can be, for example, whether the operation state of the information processing apparatus 100 is a predetermined state. As described with reference to FIG. 7, each of the above-described models requires a different amount of resources for the inference. Accordingly, using the usage state of the resources as the operation state of the information processing apparatus 100, the switching unit 113 may switch the model used for inference when the usage state of the resources is a predetermined state. For example, when the usage rate of the resources during inference exceeds a predetermined percentage (e.g., 90%), the switching unit 113 can switch the model used for inference to a model that consumes fewer resources during inference. For example, when, as the usage state of the resources, the usage rate of the resources during inference is less than a predetermined percentage (e.g., 30%), the switching unit 113 can switch the model used for inference to a model that consumes more resources during inference (i.e., that provides higher inference accuracy). In this manner, the switching condition used by the switching unit 113 according to the present embodiment may be set according to, for example, the resource usage rate of the information processing apparatus 100, or another model characteristic such as one of the items indicated in FIG. 7. The following descriptions will be given using the usage rate as the usage state of the resource.

Here, the switching unit 113 obtains the usage rate of the resources during inference (a computing resource usage state) of the information processing apparatus 100. A CPU usage rate, a RAM usage rate, a GPU computing unit usage rate, or a GPU memory usage rate, for example, can be used as the resource usage rate. Here, an Application Programming Interface (API) for obtaining the CPU usage rate, the RAM usage rate, the GPU computing unit usage rate, or the GPU memory usage rate, provided by an Operating System (OS), for example, is used to obtain the computing resource usage state. The switching unit 113 can determine whether the switching condition is satisfied based on the obtained resource usage rate. For example, when the resource usage rate such as the CPU usage rate, the RAM usage rate, the GPU computing unit usage rate, or the GPU memory usage rate exceeds a first threshold (90%) while the model in (A) of FIG. 7 is being used, the switching unit 113 may switch the model used for inference to a model having a lower inference computation load (here, any of (B) to (E) indicated in FIG. 7, e.g., (B)). Additionally, for example, when the resource usage rate is less than a second threshold (30%) while the model in (E) of FIG. 7 is being used, the switching unit 113 may switch the model used for inference to a model having a higher inference accuracy (here, any of (A) to (D) indicated in FIG. 7, e.g., (B)). In this manner, the switching unit 113 according to the present embodiment switches the model used for inference based on the model characteristics (such as accuracy, memory usage, inference computation load, or dependence on previous inference) and the usage rate of the resources of the information processing apparatus 100.

In the present embodiment, the model is not reinitialized when the model is switched. In the initial setting of the network model used for inference, the image restoration unit 115 constructs a model having a network structure that can be implemented by switching the components of the network structure, for all the registered models (e.g., those illustrated in FIGS. 6A to 6E). In the model switching processing according to the present embodiment, the processing of switching from the first machine learning model to the second machine learning model by switching the model parameters and paths is performed having carried over the model region from before the switch, and processing for reconstructing the model is not performed.

For example, the model is switched from that illustrated in FIG. 6A to that illustrated in FIG. 6B by changing the parameters of the first inference processing 602 and changing the parameters of the second inference processing 604. In this switch, only the processing for changing the parameters is performed, and processing for initializing (performing initial settings) the network structure and reconstructing the trained model 220 is skipped. Furthermore, the model is switched from that illustrated in FIG. 6B to that illustrated in FIG. 6C by changing the parameters of the first inference processing 602, changing the parameters of the second inference processing 604, and changing the paths among the nodes. In other words, although only one set of inputs is illustrated in FIG. 6C, the model region from before the switch is carried over internally in the model illustrated in FIG. 6C as well, and the model remains constructed with a structure in which the first inference processing 602 can be executed three times, in the same manner as in FIG. 6B. However, the paths from FIG. 6B are not used in the model illustrated in FIG. 6C, and the paths illustrated in FIG. 6C are used instead. Compared to a case where the model is reconstructed after initializing the network structure when switching the model, the processing according to the present embodiment eliminates the need to reconstruct the model, and makes it possible to accelerate the switching of the model, by carrying over the model region from before the switch when switching the model.

Flow of Processing in Overall System

Figure 9A:
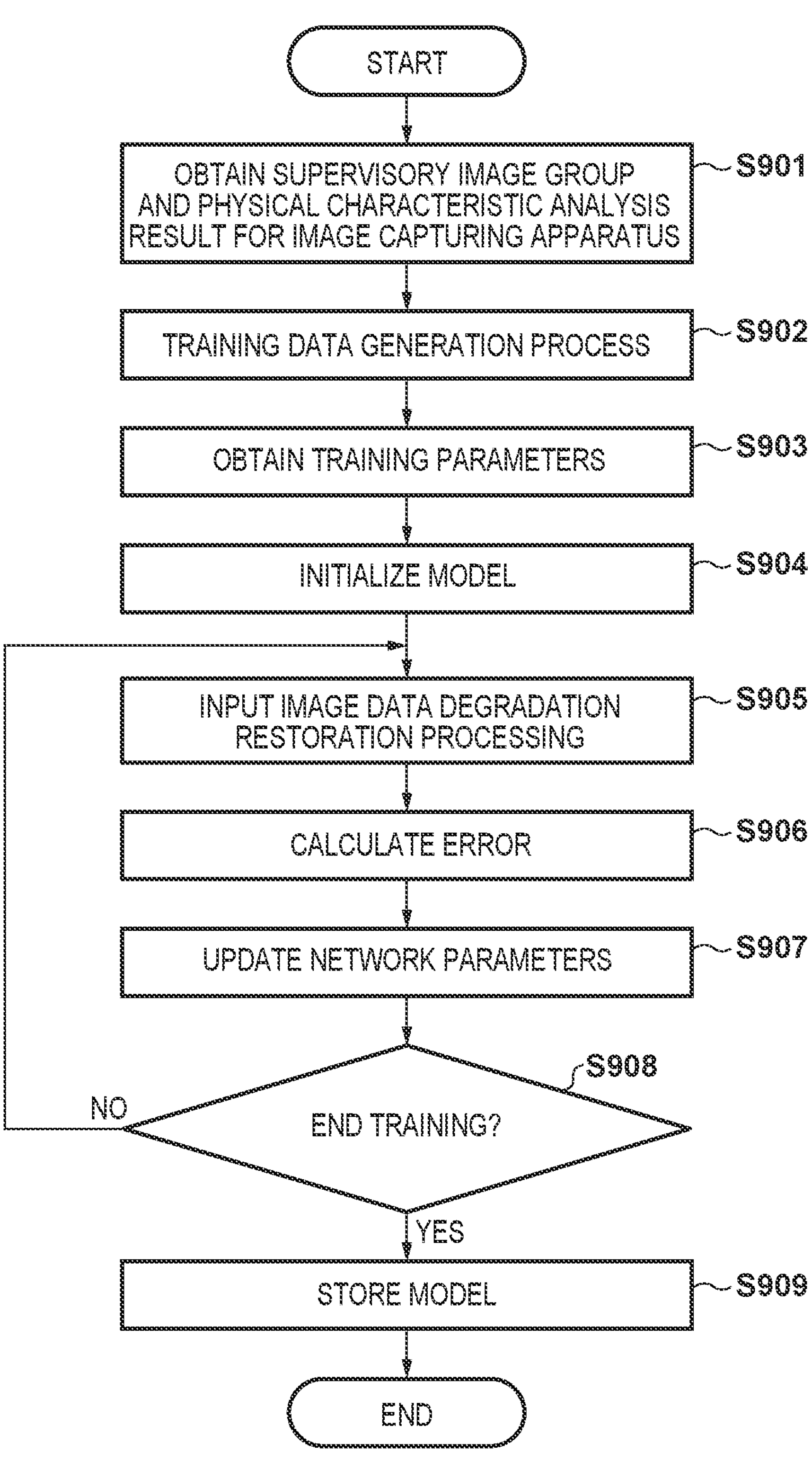
FIG. 9A is a flowchart illustrating an example of training processing according to the first embodiment.
Figure 9B:
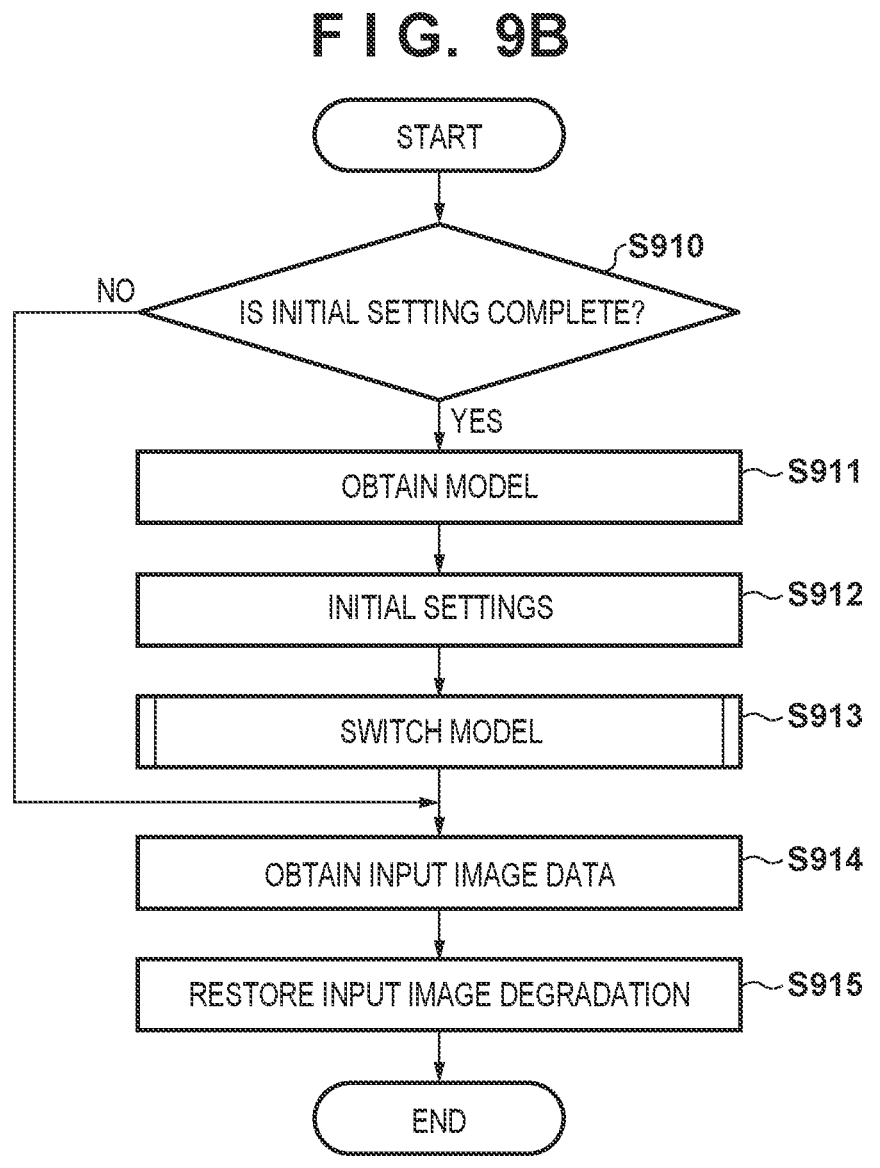

The various processing performed by the information processing system according to the present embodiment will be described next with reference to FIGS. 9A to 9C. FIGS. 9A to 9C are flowcharts illustrating an example of the processing performed by the information processing system according to the present embodiment. The functional units illustrated in FIG. 2 are realized by the CPU 101 or 201 executing information processing computer programs according to the present embodiment. However, some or all of the functional units illustrated in FIG. 2 may be implemented by hardware. Descriptions will be given hereinafter with reference to the flowcharts illustrated in FIGS. 9A to 9C. Note that in the following descriptions, "S" indicates a processing step.

An example of the flow of the restoration training performed by the cloud server 200 will be described first with reference to the flowchart in FIG. 9A. In S901, the supervisory image group 217 prepared in advance, as well as the physical characteristic analysis result 218 for the image capturing apparatus 10, such as the characteristics of the image sensor, the sensitivity at the time of shooting, the subject distance, the lens focal length and F-number, and the exposure value, are input to the cloud server 200. Note that the supervisory image data is assumed to be Bayer-array RAW images, which are obtained by capturing images using the image capturing apparatus 10. However, the method for obtaining the supervisory image group 217 is not particularly limited, and for example, images captured in advance may be stored in an HDD or the like and uploaded to the server.

In S902, the degradation adding unit 211 generates degradation training image data by adding noise based on the physical characteristic analysis result 218 of the image capturing apparatus to the supervisory image data of the supervisory image group 217 input in S901 as a degradation factor. Here, it is assumed that the degradation adding unit 211 adds, to the supervisory image data, an amount of noise measured in advance based on the physical characteristic analysis result 218 of the image capturing apparatus, either in a preset order or in a random order.

In S903, the training unit 212 obtains the training parameters 219 to be applied in the restoration training. The training parameters here include the initial values of the parameters of the neural network model, the network structure of the model, and the hyperparameters indicating the optimization method, as described earlier.

In S904, the image restoration unit 214 makes initial settings for the model using the received network parameters. In S905, the image restoration unit 214 performs restoration processing on the degradation training image data, using the degradation training image data as an input to the model.

In S906, the error calculation unit 215 calculates the error between the result of the restoration in S905 and the supervisory image data according to the loss function indicated by Formula (3). In S907, the model updating unit 216 updates the network parameters of the model so as to reduce (minimize) the error obtained in S906.

In S908, the training unit 212 determines whether to end the training. For example, the training unit 212 determines to end the training when the number of network parameter updates has reached a predetermined number, or when a predetermined period has passed following the start of the training. The sequence moves to S909 if the training is to be ended, and returns to S905 if the training is not to be ended. In the second and subsequent iterations of S905 to S908, the training is continued using unprocessed degradation training image data and supervisory image data. In S909, the training unit 212 stores the trained model in the mass storage apparatus 204 or the like.

An example of the flow of restoration inference processing performed by the information processing apparatus 100 will be described next with reference to the flowchart in FIG. 9B. In S910, the image restoration unit 115 determines whether initial settings have been made for the network model to be used for inference. If so, the sequence moves to S913, and if not, the sequence moves to S911.

In S911, the model storage unit 119 obtains the trained model 220 from the cloud server 200 and stores the model. In S912, the image restoration unit 115 makes initial settings for the model to be used for inference in order to start the inference using the trained model 220 stored in the model storage unit 119.

In S913, the switching unit 113 performs the model switching processing. This processing will be described later with reference to FIG. 9C. In S914, the information processing apparatus 100 obtains the input image data 116, which is a Bayer-array RAW image to be subject to the image restoration processing. As the RAW image, an image captured by the image capturing apparatus 10 may be input directly, or an image captured in advance and stored in the mass storage apparatus 104 may be read out, for example. A number of images necessary for the image restoration in S915 is obtained for the input image data 116.

In S915, the image restoration unit 115 restores the input image data 116. In S915, the image data restored by the image restoration unit 115 is output as output image data 118, after which the processing illustrated in FIG. 9B ends. Meanwhile, if there is data to be carried over to a subsequent inference, as with the intermediate output 603 of the model illustrated in FIG. 6C, that data is stored in the image restoration unit 115 and carried over to the subsequent inference.

An example of the flow of the model switching processing performed by the switching unit 113 of the information processing apparatus 100 will be described next with reference to the flowchart in FIG. 9C. In S920, the switching unit 113 obtains the resource usage state.

In S921, the switching unit 113 obtains the model characteristics of the trained model 220 saved in the model storage unit 119. These model characteristics are values pertaining to items such as accuracy, memory usage, and the like, as illustrated in FIG. 7. In S922, based on the resource usage state obtained in S920 and the model characteristics obtained in S921, the switching unit 113 selects the model to be used for the next inference (the model to be switched to) from among the trained models 220 stored in the model storage unit 119.

Thereafter, the switching unit 113 switches the model when the resource usage rate exceeds the first threshold, for example, as described above. Here, the switching unit 113 may, for example, set a rank among the models (A) and (E) for the item "inference computation load" in the model characteristics, and then switch to a model ranked one place below the model currently being used when the resource usage rate exceeds the first threshold. Alternatively, the switching unit 113 may switch to a model ranked one place above the model currently being used when the resource usage rate exceeds the second threshold. The switching unit 113 may perform different processing based on the ranking, such as setting a third threshold higher than the first threshold in addition to the first threshold, and switching the model to a model ranked two places below the model currently being used when the resource usage rate exceeds the third threshold. Here, when the resource usage rate is no greater than the first threshold and at least the second threshold, it is assumed that the model currently being used is selected as the model to be switched to.

Here, the model is switched when that the resource usage rate has been confirmed as exceeding the first threshold once. However, in order to suppress situations where the model is switched too frequently, the resource usage rate in a predetermined period may be evaluated multiple times, and whether to switch the model may be determined based on the result thereof. For example, the switching unit 113 may obtain the model characteristics in S921 for a predetermined period (e.g., a predetermined number of times at predetermined intervals), and switch the model when the period during which the model characteristics exceed the first threshold is at least a predetermined percentage. Alternatively, the switching unit 113 may hold the information on the model characteristics obtained in S921, and switch the model when there is at least a predetermined percentage of model characteristics exceeding the first threshold in the most recent predetermined period. Here, the predetermined percentage may be 100% or 80%, and can be set by the user as desired according to desired conditions.

In S923, the switching unit 113 determines whether the model selected in S922 is different from the model currently being used. If the models are different, the sequence moves to S924, whereas if the models are the same, the processing ends. In S924, the switching unit 113 switches the model used by the image restoration unit 115 to the model selected in S922, and ends the processing.

The foregoing has described the overall flow of processing performed by the information processing system according to the present embodiment. According to such processing, when switching models, carrying over the model region from before the switch and switching only the parameters, paths, and the like eliminates the need to perform processing for reconstructing the model, and thus makes it possible to accelerate the model switch.

Although the present embodiment describes generating the training data in S902, the training data may be generated later. Specifically, the configuration may be such that the input image data corresponding to the supervisory image data is generated in the subsequent restoration training. In addition, although the present embodiment describes the cloud server 200 as performing training from scratch using the data of a supervisory image group prepared in advance, a machine learning model having trained network parameters may be obtained and the processing may then be performed using that model.

Although the present embodiment describes the processing as being performed using noise as the degradation factor, similar processing can be performed even when a degradation factor other than noise is used. For example, as described above, blur, aberration, compression, low resolution, defects, or the like, or a drop in contrast caused by fog, haze, snow, rain, or the like at the time of shooting, may be used as the degradation factor, or a plurality of combinations thereof may be used.

Although the present embodiment describes an example in which the information processing apparatus 100 uses the trained model to perform restoration based only on the input image data, additional parameters that assist in image restoration may be used as well. For example, the information processing apparatus 100 may store, in advance, a lookup table which provides estimates on the extent to which image quality degradation is expected to occur depending on shooting conditions such as the distance to the subject, the focal length, the sensor size, the exposure, or the like, and may adjust a restoration amount by referring to the lookup table when restoring the image. In other words, the inference unit 112 of the information processing apparatus 100 may adjust the restoration strength for degradation based on the shooting conditions under which the image in the input image data was shot.

Although the present embodiment describes an example in which a machine learning model that performs image restoration processing is used, the task of the model is not limited to image restoration processing, and processing can be performed in the same manner even when using a model that performs image recognition or the like, for example. Additionally, the machine learning algorithm according to the present embodiment is not limited to a neural network, and another algorithm may be used instead.

Second Embodiment

The first embodiment described an example of an information processing apparatus that makes a model switch determination based on a resource usage state. An information processing apparatus 1000 according to a second embodiment obtains user settings and makes the model switch determination based on the obtained user settings. In other words, the information processing apparatus 1000 according to the present embodiment switches the model used for inference from a first model to a second model when the user settings satisfy a predetermined condition. Details that are the same as in the configurations described in the first embodiment, such as the basic configuration and the like of the information processing system, will be omitted, and the following descriptions will focus on the differences from the first embodiment.

FIG. 10 is a block diagram illustrating the overall functional configuration of the information processing system according to the second embodiment. In the information processing system illustrated in FIG. 10, the functional units of the cloud server 200 according to the second embodiment are the same as in the first embodiment and will therefore not be described. Additionally, the information processing apparatus 1000 according to the second embodiment includes a setting unit 1001 and a settings storage unit 1002, and includes a switching unit 1003 instead of the switching unit 113. Aside from these, however, the configuration is the same as that of the information processing apparatus 100 illustrated in FIG. 2, and redundant descriptions will therefore be omitted.

The setting unit 1001 receives, via the input apparatus 20 or the network I/F 106, an input for user settings pertaining to the inference, and stores the input user settings in the settings storage unit 1002. The switching unit 1003 reads the user settings from the settings storage unit 1002, and switches the trained model 220 executed by the image restoration unit 115 in accordance with whether the user settings satisfy a predetermined condition.

Settings pertaining to inference, such as settings for whether to prioritize speed or accuracy in the inference, settings for the image quality in restoration, settings for the degree of restoration, settings for whether the input degraded image was captured indoors or outdoors, and the like are used as the user settings. Processing performed by the information processing apparatus 1000 for these user settings will be described next with reference to FIGS. 11A and 11B.

Figure 11A:
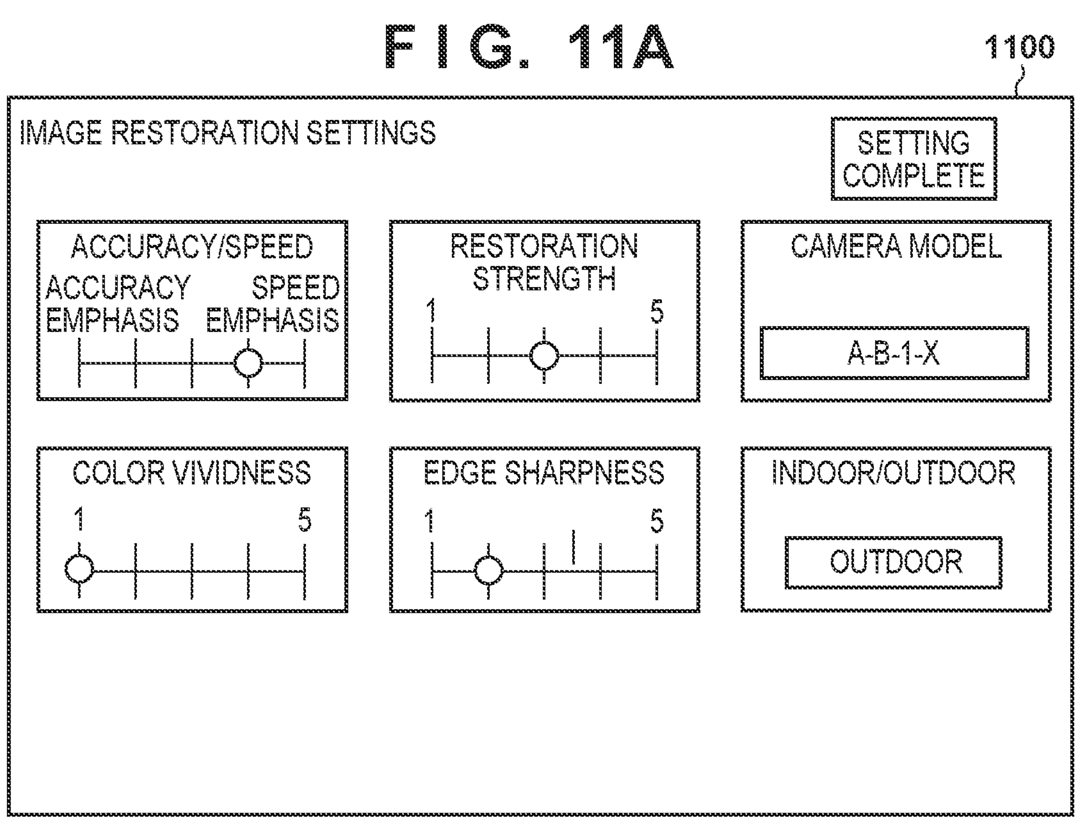
FIGS. 11A and 11B are diagrams illustrating an example of a settings screen according to the second embodiment.
Figure 11B:
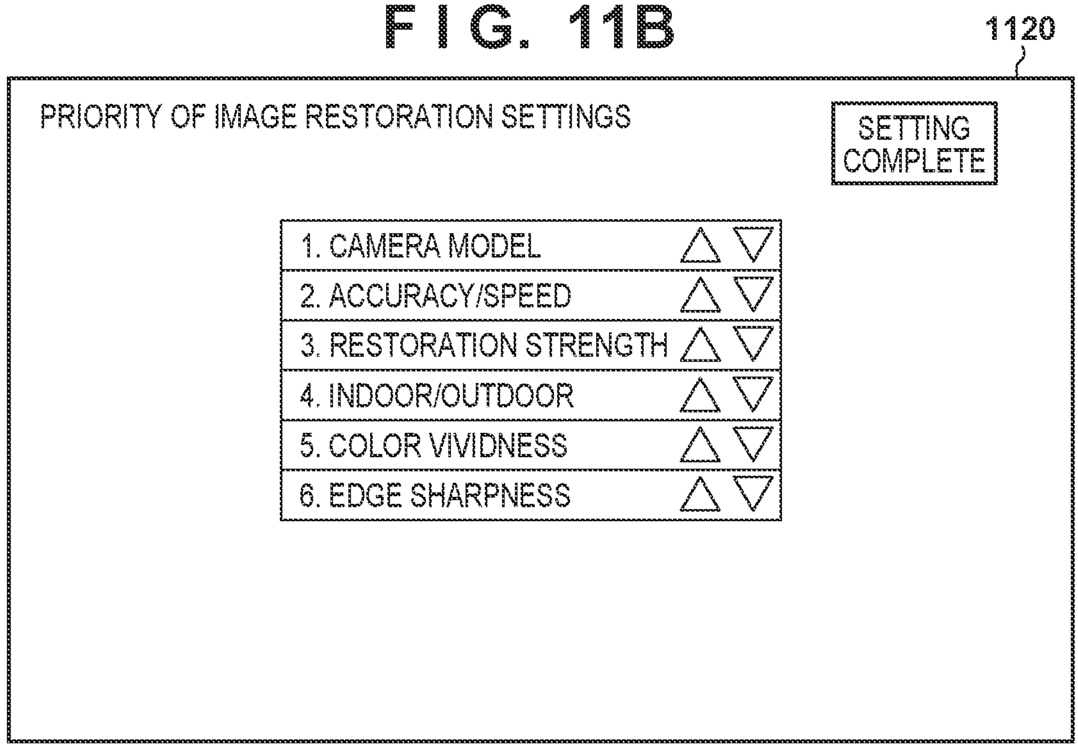

FIGS. 11A and 11B are examples of settings screens for obtaining the user settings. These settings screens are displayed in the display apparatus 40, and values are selected via the input apparatus 20. 1100 in FIG. 11A is an example of a screen for image restoration settings, and the current user settings for each items are displayed. In FIG. 11A, "accuracy/speed", "restoration strength", "camera model", "color vividness", "edge sharpness", and "indoor/outdoor" are displayed as examples of items for the image restoration settings, and the settings are input by the user for each of these setting items.

Whether to prioritize speed or accuracy in the inference is set through the "accuracy/speed" setting item. Here, when a setting to prioritize speed is made, the switching unit 1003 prioritizes selecting a model having a low inference computation load (e.g., selects a model ranked one place below the model currently being used for the item "inference computation load").

The degree of restoration is set in the "restoration strength" setting item. The restoration strength is input as one of five levels, from 1 to 5, and the model to be switched to is selected according to the input value. For example, if the value of the restoration strength exceeds a predetermined threshold (e.g., 4), the switching unit 1003 may switch to a model in which the restoration strength is higher than in the model currently being used, and may select a model corresponding to the value of the restoration strength as the model to be used for the inference.

Whether the input image was captured indoors or outdoors is set in the "indoor/outdoor" setting item. For example, the stored models may be classifies as models better for restoring indoor images and models better for restoring the outdoor image, and when the settings for "indoor/outdoor" are changed, the switching unit 1003 may switch the model to correspond to those settings.

In addition, when a model suited to the camera model is set and a specific camera model is set in the "camera model" item, the switching unit 1003 refers to the settings and selects a model suitable for restoring images captured by that camera model.

A screen 1120 illustrated in FIG. 11B is an example of a screen for setting the priority of the setting items. By determining an order in which to prioritize the setting items, the switching unit 1003 can make the model switch determination using setting items having a high priority. In the screen 1120, the camera model settings are prioritized, whereas the edge sharpness settings are not prioritized. The values set in the screens illustrated in FIGS. 11A and 11B are stored in the settings storage unit 1002.

Although an example of inputting user settings using the display apparatus 40 and the input apparatus 20 has been described with reference to FIGS. 11A and 11B, these settings may be input through other methods. For example, the user settings may be input via the network I/F 106.

Flow of Processing in Overall System

Figure 12B:
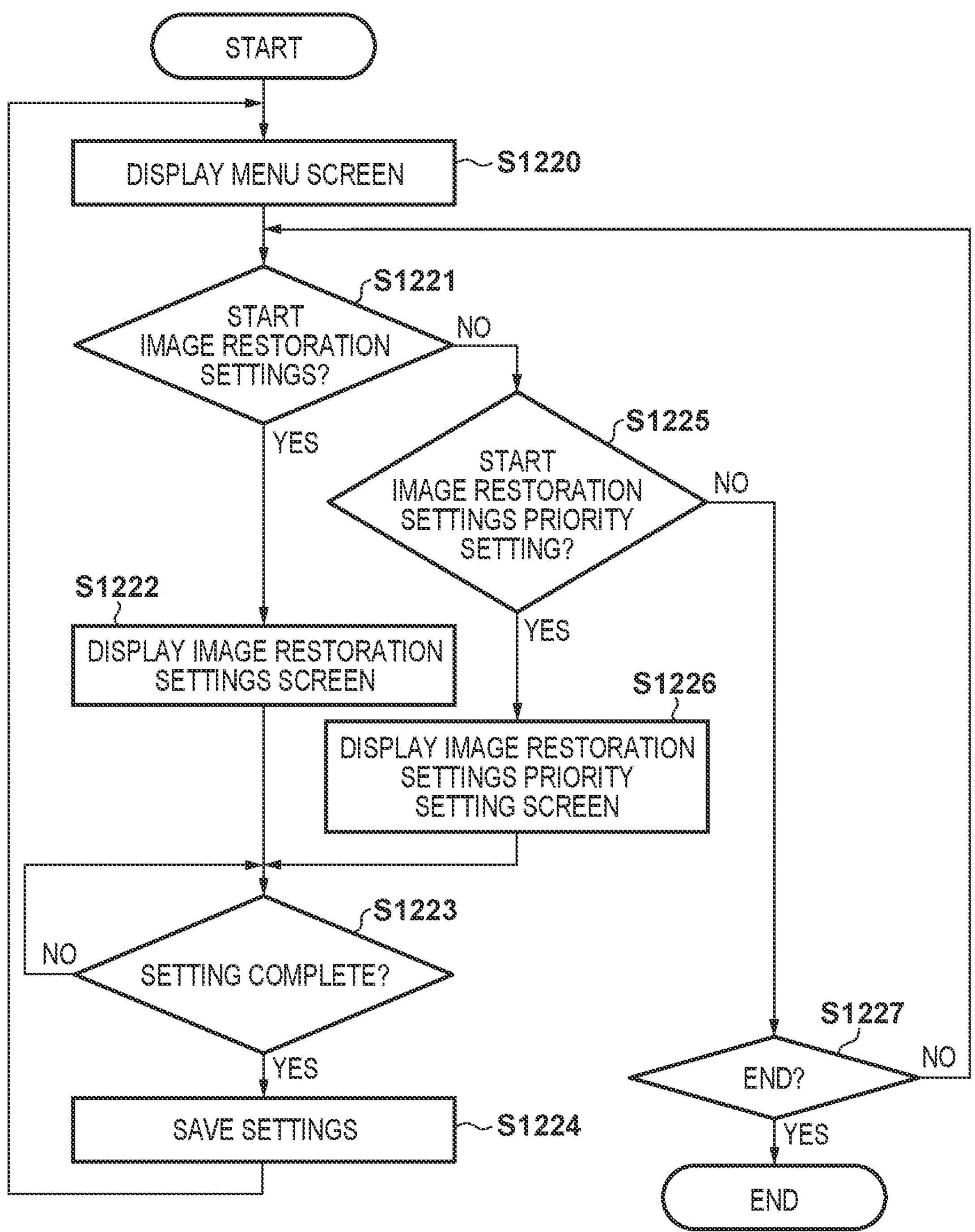
FIG. 12B is a flowchart illustrating an example of setting processing for user settings according to the first embodiment.

The various processing performed by the information processing system according to the present embodiment will be described next with reference to FIGS. 12A and 12B. FIGS. 12A and 12B are flowcharts illustrating an example of the processing performed by the information processing system according to the present embodiment. The functional units illustrated in FIG. 10 are realized by the CPU 101 or 201 executing information processing computer programs according to the present embodiment.

FIG. 12A is a flowchart illustrating an example of a restoration inference processing performed by the information processing apparatus 1000. The processing illustrated in FIG. 12A is the model switching processing performed in S913, and aside from S1200 and S1201 being performed instead of S920 and S922, respectively, the processing is the same as that illustrated in FIG. 9C and described in the first embodiment, and redundant descriptions will therefore be omitted.

In S1200, the switching unit 1003 obtains the user settings stored in the settings storage unit 1002. The user settings to be obtained are, for example, the image restoration settings and the priority of the image restoration settings, illustrated in FIGS. 11A and 11B.

In S1201, the switching unit 1003 selects the model to be switched to from among the trained models 220 stored in the model storage unit 119 based on the settings obtained in S1200 and the model characteristics obtained in S921. Here, the model is selected using the setting for the item in the image restoration settings that has a high (e.g., the highest) priority. For example, if the priority of the camera model settings is the highest, as illustrated in FIG. 11B, a model suitable for the set camera model is selected preferentially.

FIG. 12B is a flowchart illustrating an example of the setting processing for the user settings, performed by the setting unit 1001 according to the present embodiment. In S1220, the setting unit 1001 displays a menu screen in the display apparatus 40. This menu screen is, for example, a screen for displaying a menu for opening the screens illustrated in FIGS. 11A and 11B, and displays an image restoration setting start button and an image restoration settings priority setting start button. Hereinafter, "pressing a button" means that the user performs an operation for pressing a button, and may be an operation made on a touch panel or using a mechanical button.

In S1221, the setting unit 1001 determines whether the image restoration setting start button has been pressed. If the button has been pressed, the sequence moves to S1222, and if not, the sequence moves to S1225. In S1222, the setting unit 1001 reads the current settings from the settings storage unit 1002, and displays an image restoration settings screen, such as that illustrated in FIG. 11A, in the display apparatus 40.

In S1223, the setting unit 1001 determines whether the user has pressed a setting completion button. If the button has been pressed, the sequence moves to S1224, and if not, the sequence returns to S1223. In S1224, the setting unit 1001 saves the settings in the settings storage unit 1002, and the sequence returns to S1220.

In S1225, the setting unit 1001 determines whether the image restoration settings priority setting start button has been pressed. If the button has been pressed, the sequence moves to S1226, and if not, the sequence moves to S1227. In S1226, the setting unit 1001 reads the current settings from the settings storage unit 1002, and displays an image restoration settings priority setting screen, such as that illustrated in FIG. 11B, in the display apparatus 40. In S1227, the setting unit 1001 returns to S1221 and repeats the sequence unless a request to stop is made.

The foregoing has described the overall flow of processing performed by the information processing system according to the present embodiment. According to this processing, user settings can be obtained, and whether to switch the model used for inference can be determined in accordance with the obtained user settings.

Although the user settings according to the present embodiment have been described as being input through the input apparatus 20, some or all of the user settings may be set automatically. For example, the "camera model" or "indoor/outdoor" setting items may be automatically obtained and set from the information added to the input image data. Additionally, the "restoration strength" setting item may be set automatically based on the amount of noise obtained from analyzing the input image data.

Third Embodiment

The first embodiment described processing using a machine learning model that performs image restoration processing. A third embodiment will describe an example of an information processing apparatus that uses a machine learning model which performs classification processing for determining the type of an object in an image, instead of a machine learning model that performs image restoration processing as described in the first embodiment. Details that are the same as in the configurations described in the first embodiment, such as the basic configuration and the like of the information processing system, will be omitted, and the following descriptions will focus on the differences from the first embodiment. The machine learning algorithm in the classification according to the present embodiment uses a random forest, for example. "Random forest" is a machine learning technique based on decision trees, and because it is a publicly-known technique, it will not be described here.

Figure 13:
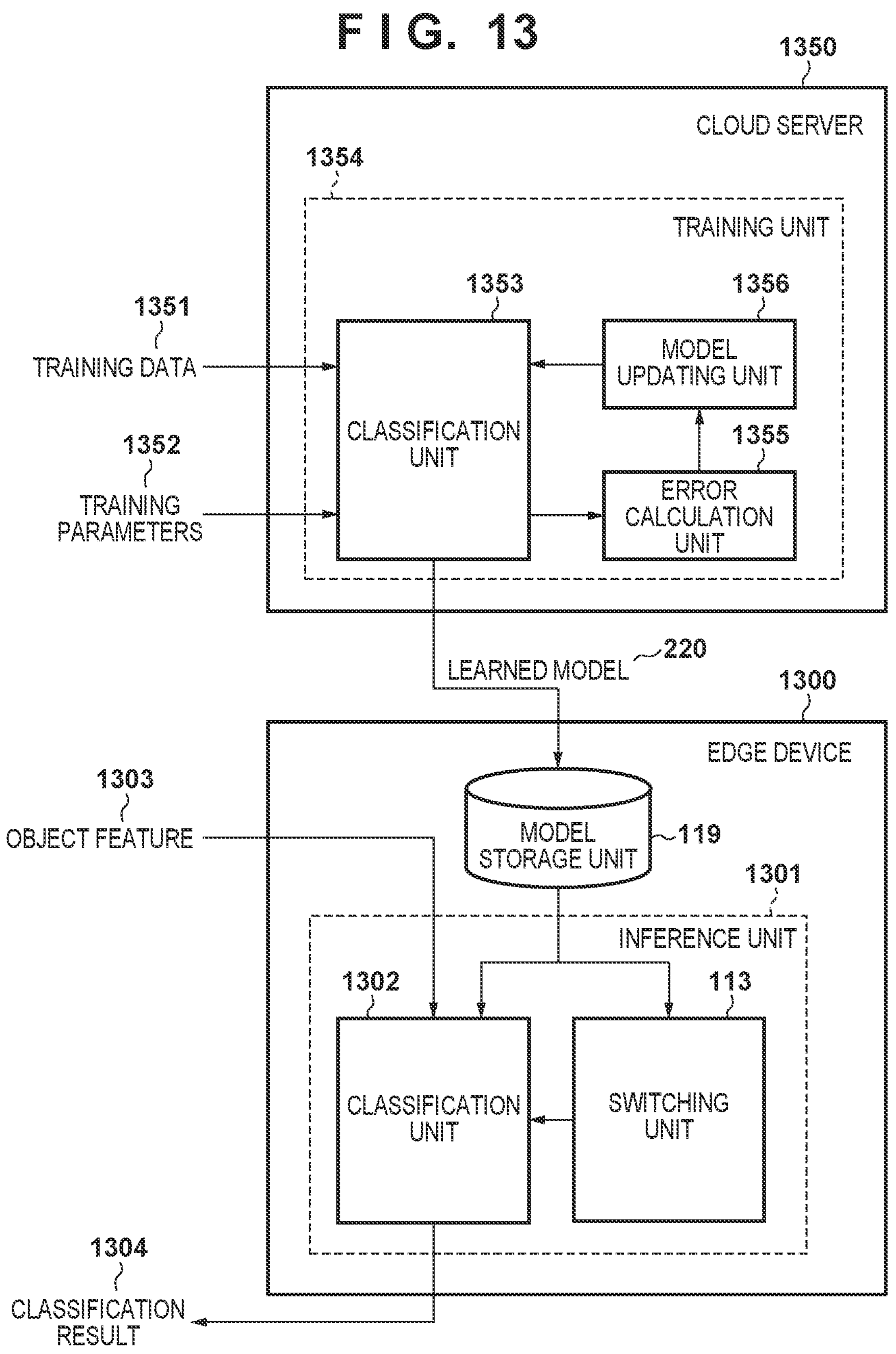
FIG. 13 is a block diagram illustrating an example of the functional configuration of an information processing apparatus according to a third embodiment.

FIG. 13 is a block diagram illustrating the overall functional configuration of the information processing system according to the third embodiment. An information processing apparatus 1300 according to the third embodiment includes an inference unit 1301 having a classification unit 1302 for inference instead of the image restoration unit 115. Aside from this, however, the configuration is the same as that of the information processing apparatus 100 illustrated in FIG. 2, and redundant descriptions will therefore be omitted.

The model storage unit 119 stores the trained model 220 received from a cloud server 1350. The inference unit 1301 has a classification function for determining a type of an object based on a feature of the object in an image.

The classification unit 1302 for inference includes a decision tree model execution unit for classification. The classification unit 1302 receives an object feature 1303 in the image as an input and outputs a classification result 1304, which is a result of classifying the object. The classes in the classification according to the present embodiment are types of objects, such as humans, ships, mountains, or the like, for example, and the classification result 1304 indicates a likelihood of each class. The object feature 1303 is a feature extracted from the image in which the object is captured, and although the feature is assumed to be extracted outside the information processing apparatus 1300 in the present embodiment, the configuration may be such that the information processing apparatus 1300 obtains the image and extracts the object feature 1303.

The cloud server 1350 includes a training unit 1354. The training unit 1354 includes a classification unit 1353 for training, an error calculation unit 1355, and a model updating unit 1356. The training unit 1354 obtains training parameters 1352, and performs classification training using training data 1351. The training data 1351 according to the present embodiment includes a plurality of pairs each including object features and supervisory data representing classes of objects. The training parameters 1352 include parameters such as the tree depth of the decision tree model, a method for generating random numbers, and the like. The classification unit 1353 receives an object feature included in the training data 1351 as an input and outputs a classification result. The error calculation unit 1355 calculates error between the classification result and the supervisory data.

The model updating unit 1356 updates the parameters of the decision tree model of the classification unit 1353 based on the calculated error.

Figure 14A:
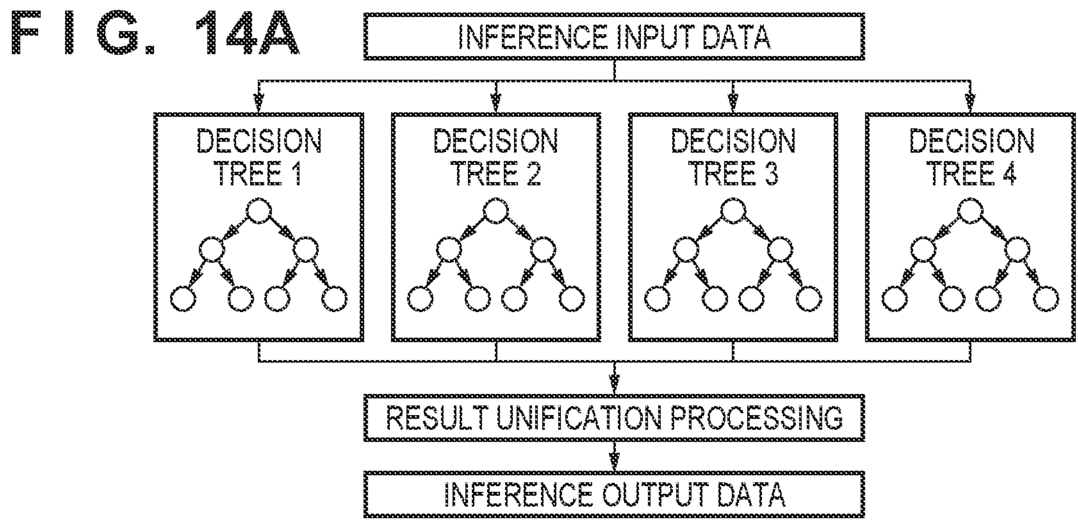
FIGS. 14A, 14B, and 14C are diagrams illustrating an example of the network structure of a model according to the third embodiment.
Figure 14B:
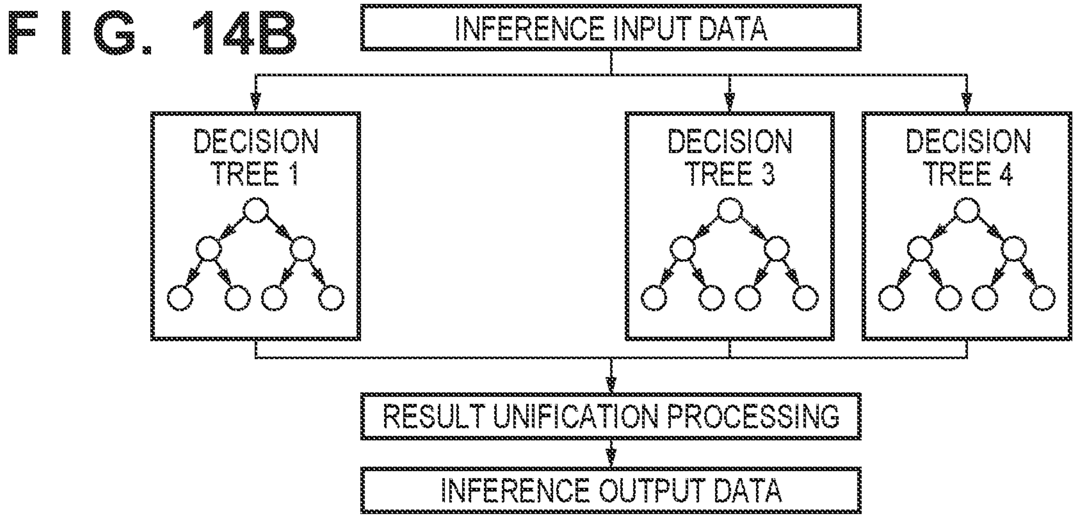
Figure 14C:
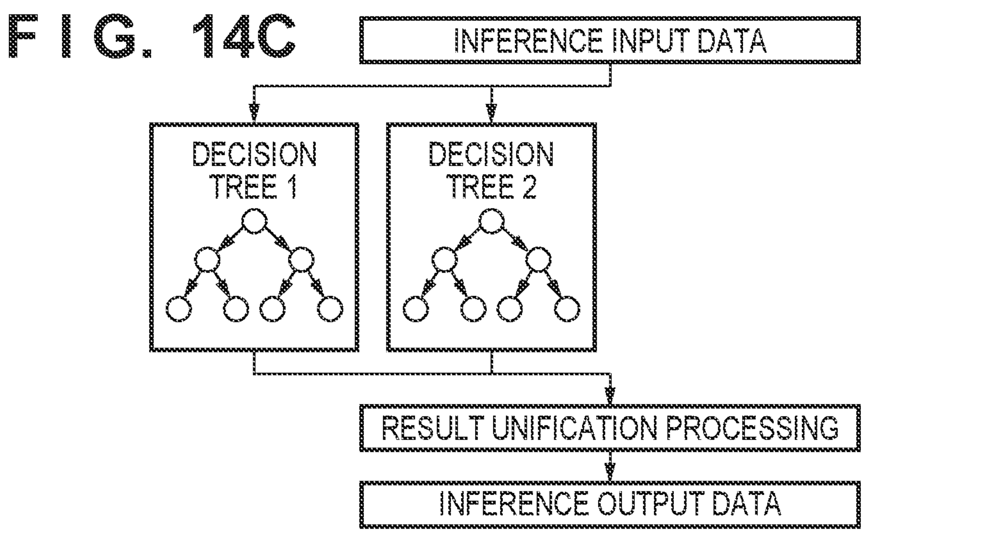

An example of the structure of the trained model 220 executed by the classification unit 1302 will be described here with reference to FIGS. 14A to 14C. FIGS. 14A to 14C are schematic diagrams illustrating networks in a model in which classification is performed using a random forest. The network structure of the model using a random forest is constituted by a plurality of decision trees. The models illustrated in FIGS. 14A to 14C use any or all of decision trees 1 to 4.

The model illustrated in FIG. 14A uses all the decision trees, and has a higher classification accuracy, but a higher processing load, than the models illustrated in FIGS. 14B and 14C. On the other hand, because the models illustrated in FIGS. 14B and 14C use fewer decision trees than that illustrated in FIG. 14A, the processing load is relatively low, but the classification accuracy is also relatively low.

In the present embodiment, in the initial settings of the classification unit 1302, a model having a network structure that can be implemented by changing the components of the network structure is constructed. In the model switching processing according to the present embodiment, processing for switching from the first machine learning model to the second machine learning model by switching the model parameters and paths is performed, but processing for reconstructing the model is skipped, in the same manner as in the first embodiment.

Figure 15A:
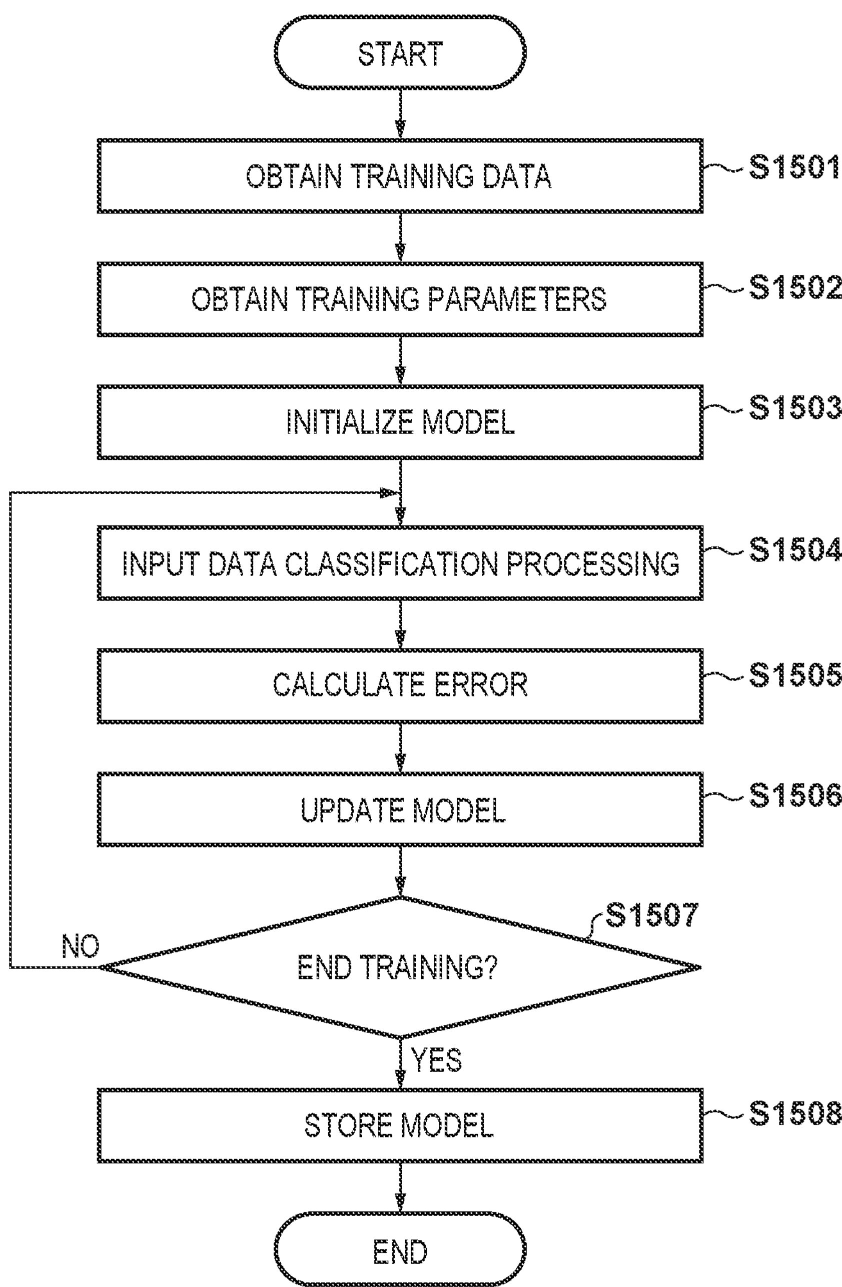
FIG. 15A is a flowchart illustrating an example of training processing according to the third embodiment.

The various processing performed by the information processing system according to the present embodiment will be described next with reference to FIGS. 15A and 15B. FIGS. 15A and 15B are flowcharts illustrating an example of the processing performed by the information processing system according to the present embodiment. The functional units illustrated in FIG. 13 are realized by the CPU 101 or 201 executing information processing computer programs according to the present embodiment. An example of the flow of the classification training performed by the cloud server 1350 will be described hereinafter with reference to the flowchart in FIG. 15A.

In S1501, the cloud server 1350 obtains the training data 1351 to be applied in the classification training. In S1502, the cloud server 1350 obtains the training parameters 1352 to be applied in the classification training.

In S1503, the classification unit 1353 makes initial settings for the model using the training parameters obtained in step S1502. In S1504, the classification unit 1353 classifies an object using an object feature included in the training data 1351 as an input to the model.

In S1505, the error calculation unit 1355 calculates error between the classification result and the supervisory data in accordance with a loss function. In S1506, the model updating unit 1356 updates the model so as to reduce (minimize) the error obtained in S1505.

In S1507, the training unit 1354 determines whether to end the training. For example, the training unit 1354 determines to end the training when the number of model updates has reached a predetermined number, or when a predetermined period has passed following the start of the training. The sequence moves to S1508 if the training is to be ended, and returns to S1504 if the training is not to be ended. In the second and subsequent iterations of S1504 to S1507, the training is continued using unprocessed object features and supervisory data. In S1508, the training unit 1354 stores the trained model in the mass storage apparatus 204 or the like.

An example of the flow of classification performed by the information processing apparatus 1300 will be described next with reference to the flowchart in FIG. 15B. In S1550, the classification unit 1302 determines whether initial settings have been made for the network model to be used for inference. If so, the sequence moves to S1553, and if not, the sequence moves to S1551.

In S1551, the model storage unit 119 obtains the trained model 220 from the cloud server 1350 and stores the model. In S1552, the classification unit 1302 makes initial settings for the model to be used for inference in order to start the inference using the trained model 220 stored in the model storage unit 119.

In S1553, the switching unit 113 performs the model switching processing. This processing is the same as that described with reference to FIG. 9C, and will therefore not be described here. In S1554, the information processing apparatus 1300 obtains the object feature 1303 to be classified. In S1555, the classification unit 1302 classifies the object feature 1303 and outputs the classification result 1304.

The foregoing has described the overall flow of processing performed by the information processing system according to the present embodiment. According to such processing, when switching models, carrying over the model region from before the switch and switching only the parameters, paths, and the like eliminates the need to reconstruct the model, and thus makes it possible to accelerate the model switch, even when performing inference using a model which performs classification processing. Note that the machine learning algorithm according to the present embodiment is not limited to a decision tree, and another algorithm may be used instead.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-033068, filed Mar. 3, 2023, which is hereby incorporated by reference herein in its entirety.

What is claimed is:

1. An information processing apparatus comprising:

at least one processor; and a memory coupled to the at least one processor, the memory storing instructions that, when executed by the at least one processor, cause the at least one processor to:

perform inference on an input using a first machine learning model; and select a second machine learning model, in which at least some of components of a network structure of the first machine learning model have been changed, as a machine learning model used for the inference, in response to a predetermined condition being satisfied, wherein the first machine learning model has a first component and a second component, wherein the second machine learning model has at least a component in which a parameter or a path between nodes in the first component or the second component has been changed, wherein the first machine learning model includes a first inference unit having a first parameter and a second parameter different from the first parameter, as the first component, and a second inference unit that takes an output of the first inference unit as an input, as the second component, wherein the second machine learning model includes a third inference unit in which the second parameter in the first inference unit has been replaced with the first parameter, and a fourth inference unit having a same network structure as the second inference unit and taking an output of the third inference unit as an input, wherein the first machine learning model includes a first inference unit that outputs a first output from first inference processing and a second output from second inference processing, as the first component, and a second inference unit that takes the first output and the second output as inputs, as the second component, wherein the second machine learning model includes a fifth inference unit that outputs a first output from first inference processing, and a sixth inference unit that takes the first output and the second output that has been output previously as inputs, wherein the inference is processing for restoring a degraded image that is input, and wherein the degraded image is an image degraded by noise, compression, low resolution, blur, aberration, a defect, or a drop in contrast.

2. The information processing apparatus according to claim 1, wherein the predetermined condition is satisfied when an operation state of the information processing apparatus is a predetermined state.

3. The information processing apparatus according to claim 2, wherein the operation state is a usage state of a resource in the inference.

4. The information processing apparatus according to claim 3, wherein the instructions cause the at least one processor to:

switch the machine learning model used for the inference to the second machine learning model that is a machine learning model consuming fewer resources during the inference than the first machine learning model, when a usage rate of the resource is higher than a predetermined threshold for at least a predetermined percentage of a predetermined period.

5. The information processing apparatus according to claim 3, wherein the instructions cause the at least one processor to:

select the second machine learning model that has a lower number of layers than the first machine learning model, when a usage rate of the resource is higher than a predetermined threshold for at least a predetermined percentage of a predetermined period.

6. The information processing apparatus according to claim 3, wherein the instructions cause the at least one processor to:

obtain a user setting pertaining to the inference, wherein the predetermined condition is satisfied when the user setting is a predetermined state.

7. The information processing apparatus according to claim 6, wherein the instructions cause the at least one processor to:

obtain, as the user setting, a setting as to whether to prioritize speed or accuracy in the inference, wherein when speed is set to be prioritized in the inference, the machine learning model used for the inference is switched to the second machine learning model that is a machine learning model performing the inference faster than the first machine learning model, and when accuracy is set to be prioritized in the inference, the machine learning model is switched to the second machine learning model that is a machine learning model having a higher inference accuracy than the first machine learning model.

8. The information processing apparatus according to claim 6, wherein the inference is processing for restoring a degraded image that is input, and the instructions cause the at least one processor to:

obtain, as the user setting, a setting for image quality in the restoring, and take a case where the setting for the image quality in the restoring has been changed as the predetermined condition being satisfied, and switch the machine learning model used for the inference to the second machine learning model.

9. The information processing apparatus according to claim 6, wherein the inference is processing for restoring a degraded image that is input, and the instructions cause the at least one processor to:

obtain, as the user setting, a setting for a degree of the restoring, and take a case where the setting for the degree of the restoring has been changed as the predetermined condition being satisfied, and switch the machine learning model used for the inference to the second machine learning model.

10. The information processing apparatus according to claim 6, wherein the inference is processing for restoring a degraded image that is input, and the instructions cause the at least one processor to:

obtain, as the user setting, a setting as to whether the input degraded image was captured indoors or captured outdoors, and take a case where the setting as to whether the input degraded image was captured indoors or captured outdoors has been changed as the predetermined condition being satisfied, and switch the machine learning model used for the inference to the second machine learning model.

11. The information processing apparatus according to claim 6, wherein the inference is processing for restoring a degraded image that is input, and the instructions cause the at least one processor to:

obtain, as the user setting, a setting pertaining to an image capturing apparatus that captured the input degraded image, and take a case where the input degraded image was captured by a predetermined image capturing apparatus as the predetermined condition being satisfied, and switch the machine learning model used for the inference to the second machine learning model.

12. The information processing apparatus according to claim 1, wherein the inference is processing for classifying a subject in an image that is input.

13. An information processing method comprising:

performing inference on an input using a first machine learning model; and selecting a second machine learning model, in which at least some of components of a network structure of the first machine learning model have been changed, as a machine learning model used for the inference, in response to a predetermined condition being satisfied, wherein the first machine learning model has a first component and a second component, wherein the second machine learning model has at least a component in which a parameter or a path between nodes in the first component or the second component has been changed, wherein the first machine learning model includes a first inference unit having a first parameter and a second parameter different from the first parameter, as the first component, and a second inference unit that takes an output of the first inference unit as an input, as the second component, wherein the second machine learning model includes a third inference unit in which the second parameter in the first inference unit has been replaced with the first parameter, and a fourth inference unit having a same network structure as the second inference unit and taking an output of the third inference unit as an input, wherein the first machine learning model includes a first inference unit that outputs a first output from first inference processing and a second output from second inference processing, as the first component, and a second inference unit that takes the first output and the second output as inputs, as the second component, wherein the second machine learning model includes a fifth inference unit that outputs a first output from first inference processing, and a sixth inference unit that takes the first output and the second output that has been output previously as inputs, wherein the inference is processing for restoring a degraded image that is input, and wherein the degraded image is an image degraded by noise, compression, low resolution, blur, aberration, a defect, or a drop in contrast.

14. A non-transitory computer readable storage medium storing program that, when executed by a computer causes the computer to perform an information processing method comprising:

performing inference on an input using a first machine learning model; and selecting a second machine learning model, in which at least some of components of a network structure of the first machine learning model have been changed, as a machine learning model used for the inference, in response to a predetermined condition being satisfied, wherein the first machine learning model has a first component and a second component, wherein the second machine learning model has at least a component in which a parameter or a path between nodes in the first component or the second component has been changed, wherein the first machine learning model includes a first inference unit having a first parameter and a second parameter different from the first parameter, as the first component, and a second inference unit that takes an output of the first inference unit as an input, as the second component, wherein the second machine learning model includes a third inference unit in which the second parameter in the first inference unit has been replaced with the first parameter, and a fourth inference unit having a same network structure as the second inference unit and taking an output of the third inference unit as an input, wherein the first machine learning model includes a first inference unit that outputs a first output from first inference processing and a second output from second inference processing, as the first component, and a second inference unit that takes the first output and the second output as inputs, as the second component, wherein the second machine learning model includes a fifth inference unit that outputs a first output from first inference processing, and a sixth inference unit that takes the first output and the second output that has been output previously as inputs, wherein the inference is processing for restoring a degraded image that is input, and wherein the degraded image is an image degraded by noise, compression, low resolution, blur, aberration, a defect, or a drop in contrast.

* * * * *